US012356502B2

(12) United States Patent
Chaugule et al.

(10) Patent No.: US 12,356,502 B2
(45) Date of Patent: Jul. 8, 2025

(54) ON-DEVICE PHYSICAL SIM TO eSIM CONVERSION

(71) Applicant: Apple Inc., Cupertino, CA (US)

(72) Inventors: Raj S. Chaugule, Santa Clara, CA (US); Zexing Shi, San Jose, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 17/664,038

(22) Filed: May 18, 2022

(65) Prior Publication Data

US 2022/0386104 A1 Dec. 1, 2022

Related U.S. Application Data

(60) Provisional application No. 63/194,868, filed on May 28, 2021.

(51) Int. Cl.
| | | |
|---|---|---|
| *H04W 8/18* | (2009.01) | |
| *H04W 8/20* | (2009.01) | |
| *H04W 12/02* | (2009.01) | |
| *H04W 60/04* | (2009.01) | |

(52) U.S. Cl.
CPC ........... *H04W 8/183* (2013.01); *H04W 8/205* (2013.01); *H04W 12/02* (2013.01); *H04W 60/04* (2013.01)

(58) Field of Classification Search
CPC ..... H04W 8/183; H04W 8/205; H04W 12/02; H04W 60/04; H04W 12/35; H04W 12/40; H04W 8/245; H04W 84/12; H04W 88/06; H04L 63/0853
See application file for complete search history.

(56) References Cited

U.S. PATENT DOCUMENTS

| | | | | |
|---|---|---|---|---|
| 10,716,019 | B1 * | 7/2020 | Velusamy | H04W 24/06 |
| 11,146,948 | B1 * | 10/2021 | Uehling | H04W 12/30 |
| 11,463,865 | B1 * | 10/2022 | Buscher | H04W 24/08 |

(Continued)

FOREIGN PATENT DOCUMENTS

| | | |
|---|---|---|
| EP | 3337205 A1 | 6/2018 |
| EP | 3761687 A1 | 1/2021 |
| KR | 20200122231 A | 10/2020 |

OTHER PUBLICATIONS

GSMA: eSIM Whitepaper: The what and how of Remote SIM Provisioning (Year: 2018).*

(Continued)

*Primary Examiner* — Ankur Jain
(74) *Attorney, Agent, or Firm* — DICKINSON WRIGHT RLLP

(57) ABSTRACT

This application describes cellular service transfer mechanisms that can be used to convert cellular service credentials on a physical SIM (pSIM) card included in a wireless device to a newly downloaded electronic SIM (eSIM) on an embedded universal integrated circuit card (eUICC) of the wireless device. Transfer of the credentials for cellular service access can occur locally within the wireless device with authorization to transfer obtained from a mobile network operator (MNO) entitlement server associated with the pSIM. The new eSIM corresponding to the previously used pSIM can be downloaded to the eUICC from a provisioning server of the MNO.

20 Claims, 21 Drawing Sheets

(56) References Cited

U.S. PATENT DOCUMENTS

| | | | |
|---|---|---|---|
| 2008/0120174 A1* | 5/2008 | Li | G06Q 30/0225 |
| | | | 705/26.1 |
| 2012/0309451 A1* | 12/2012 | Benkelberg | G06K 7/0008 |
| | | | 455/552.1 |
| 2014/0073375 A1* | 3/2014 | Li | H04W 12/069 |
| | | | 455/558 |
| 2017/0127217 A1* | 5/2017 | Miao | H04W 76/15 |
| 2017/0353854 A1* | 12/2017 | Johnson | H04W 48/18 |
| 2019/0289454 A1* | 9/2019 | Inoue | G09C 1/00 |
| 2020/0120483 A1* | 4/2020 | Chikkala | H04W 88/06 |
| 2020/0137558 A1 | 4/2020 | Chaugule et al. | |
| 2020/0137566 A1* | 4/2020 | Jin | H04W 12/43 |
| 2020/0221294 A1* | 7/2020 | Kang | H04W 12/35 |
| 2020/0336887 A1 | 10/2020 | Ou et al. | |
| 2020/0351652 A1* | 11/2020 | Loreskär | H04W 12/35 |
| 2020/0359211 A1* | 11/2020 | Liu | H04W 8/205 |
| 2021/0014669 A1* | 1/2021 | Goyal | H04W 12/71 |
| 2021/0076195 A1* | 3/2021 | Chaugule | H04W 12/40 |
| 2021/0084465 A1* | 3/2021 | Hadadi | H04W 8/205 |
| 2021/0120409 A1* | 4/2021 | Nair | H04L 9/0844 |
| 2021/0120424 A1* | 4/2021 | Kang | H04L 67/30 |
| 2021/0160683 A1* | 5/2021 | Li | H04W 12/06 |
| 2022/0095211 A1* | 3/2022 | Nagaraju | H04W 8/183 |
| 2022/0210722 A1* | 6/2022 | Saini | H04W 8/183 |
| 2022/0326959 A1* | 10/2022 | Lee | H04L 67/34 |
| 2024/0251382 A1* | 7/2024 | Ozturk | H04W 8/183 |

OTHER PUBLICATIONS

European Patent Application 22174673.8—Extended European Search Report dated Oct. 7, 2022.

Elizabeth Jones: "How to switch from a physical SIM to an eSIM on your iPhone—AppleToolBox", Jan. 29, 2020 (Jan. 29, 2020), XP055964653, Retrieved from the Internet: URL:https://appletoolbox.com/how-to-switch-from-a-physical-sim-to-an-esim-on-your-iphone/ [retrieved on Sep. 26, 2022] * the whole document*.

Korean Patent Application No. 2022-0065151—Notice of Preliminary Rejection dated Nov. 19, 2023.

* cited by examiner

1000

Preferences Migration

| Preference Setting | pSIM Replacement | pSIM to eSIM Conversion |
|---|---|---|
| Default Data Line | ✗ | ✓ |
| Default Voice Line | ✗ | ✓ |
| Roaming Switch | ✗ | ✓ |
| Messaging Registration | ✗ | ✓ |
| Video Chat Registration | ✗ | ✓ |
| Radio Access Technology Selection | ✗ | ✓ |
| Data Mode | ✗ | ✓ |
| Caller ID Switch | ✗ | ✓ |
| Wi-Fi Calling | ✗ | ✗ |

*FIG. 10*

ON-DEVICE PHYSICAL SIM TO eSIM CONVERSION

CROSS-REFERENCE TO RELATED APPLICATIONS

The present application claims the benefit of U.S. Provisional Application No. 63/194,868, entitled "ON-DEVICE PHYSICAL SIM TO ESIM CONVERSION," filed May 28, 2021, the content of which is incorporated herein by reference in its entirety for all purposes.

FIELD

The described embodiments relate to wireless communications, including methods and apparatus to support transfer of cellular wireless services, such as cellular voice and data services, from a physical subscriber identity module (pSIM) included in a wireless device to an electronic SIM (eSIM) on an embedded universal integrated circuit card (eUICC) of the wireless device.

BACKGROUND

Newer generation, e.g., fourth generation (4G) and fifth generation (5G), cellular wireless networks, which use newer radio access technology and implement one or more $3^{rd}$ Generation Partnership Project (3GPP) Long Term Evolution (LTE), LTE Advanced (LTE-A), and 5G standards, are rapidly being developed and deployed by network operators worldwide. The newer cellular wireless networks provide a broad range of packet-based voice and data services. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), which is also referred to as a SIM card, or referred to as an electronic SIM (eSIM), when included in an embedded UICC (eUICC) of the wireless device. With a removable UICC and an unlocked wireless device, a user can access different services by replacing the UICC/SIM combination. With a configurable eUICC, eSIMs can be downloaded to the eUICC to access different wireless services. Wireless devices that accommodate multiple UICCs/SIMs and/or multiple eSIMs on an eUICC provide for multiple subscriber identities to be used by the same wireless device to access different services, including services that can span different cellular wireless networks that use different cellular radio access technologies (RATs). A user can transfer or seek to transfer cellular services associated with a physical SIM (pSIM) included in the wireless device to an eSIM on the eUICC of the wireless device, e.g., to access services and/or capabilities that cannot be provided without replacement of the pSIM in the wireless device.

SUMMARY

This Application describes cellular service transfer mechanisms that can be used to convert cellular service credentials on a physical SIM (pSIM) card included in a wireless device to an electronic SIM (eSIM) on an embedded universal integrated circuit card (eUICC) of the wireless device. Transfer of the credentials for cellular service access can occur locally within the wireless device with authorization to transfer obtained from a mobile network operator (MNO) entitlement server associated with the pSIM. A new eSIM corresponding to the previously used pSIM can be downloaded to the eUICC from a provisioning server of the MNO. In some cases, the pSIM of the wireless device includes credentials on the pSIM that do not include particular features or cannot be updated using an over-the-air (OTA) update mechanism to provide access to particular services and/or capabilities. In some embodiments, access to one or more features of a fifth generation (5G) cellular wireless network are enabled for the wireless device by converting the pSIM credentials to eSIM credentials on the eUICC of the wireless device. In some embodiments, access to a 5G standalone (SA) cellular wireless network is enabled by conversion of the pSIM to the eSIM. In some embodiments, the 5G SA cellular wireless network provides improved privacy by encryption of the subscriber identity, e.g., by use of an encrypted subscription concealed identifier (SUCI) instead of an unencrypted subscriber permanent identifier (SUPI) to communicate with and access services of a cellular wireless network. In some embodiments, conversion of the credentials from the pSIM to the eSIM provides for access to packet voice services, such as to Internet Protocol (IP) Multimedia Subsystem (IMS) voice over next generation radio (VoNR) of a 5G cellular wireless network. In some embodiments, conversion of the credentials from the pSIM to the eSIM provides for access to cellular services of a first wireless network via the new eSIM and access to cellular services of a second wireless network via substitution of the pSIM card in a SIM tray of the wireless device with a different pSIM card. In some embodiments, the wireless device determines whether a set of criteria are satisfied to convert credentials of a pSIM included in the wireless device to an eSIM on an eUICC of the wireless device. The set of criteria can include one or more of: i) whether an MNO associated with the eSIM supports a 5G SA mode, ii) whether the wireless device supports the 5G SA mode, iii) whether a 5G cellular wireless network is available to the wireless device where the wireless device is located, iv) whether the MNO supports conversion of the pSIM to an eSIM locally on the wireless device, v) whether a SUCI capability is unavailable on the pSIM of the wireless device, vi) whether a passcode security mechanism is enabled on the wireless device, or vii) whether a non-cellular wireless connection is available to the wireless device. When all or a subset of the set of criteria are satisfied and after obtaining user consent, the wireless device can perform conversion of the credentials of the pSIM to an eSIM on the wireless device. Conversion includes downloading the eSIM from an MNO provisioning server and installing the eSIM on the eUICC of the wireless device. Following conversion of the pSIM to the eSIM, the wireless device can disable the pSIM, mark the pSIM as converted, and register a corresponding eSIM software stack of the wireless device with a 5G SA cellular wireless network of the MNO. In some embodiments, one or more setting preferences associated with the previously used pSIM are transferred to the newly installed eSIM on the wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

FIG. 10 illustrates an exemplary table of a set of user-defined preferences settings for a cellular service profile that can be transferred from a pSIM to an eSIM, according to some embodiments.

DETAILED DESCRIPTION

Figure 1:
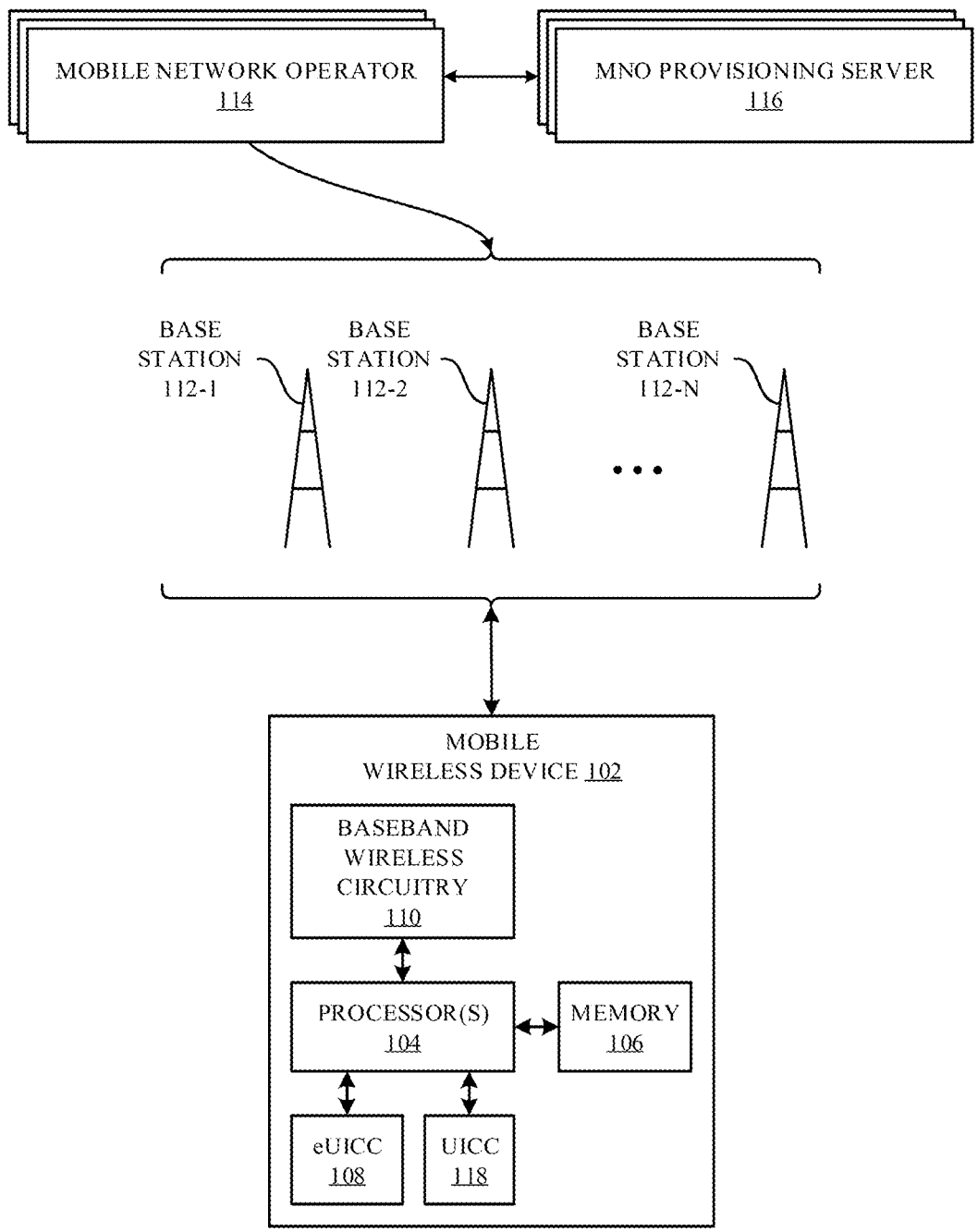
FIG. 1 illustrates a block diagram of exemplary components of a system that is configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Cellular wireless capabilities continue to be incorporated into a broad array of electronic devices, including mobile phones, tablets, portable computers, wearable devices, automobiles, etc. Additionally, credentials for access to cellular wireless services are evolving from removable secure Universal Integrated Circuit Cards (UICCs), also referred to as subscriber identity module (SIM) cards, to include electronic SIMs (eSIMs) that can be installed and updated dynamically on secure system boards, such as embedded UICCs (eUICCs). A user can seek to transfer cellular credentials from a physical SIM (pSIM) in a device to an eSIM on an eUICC of the device.

This Application describes cellular service transfer mechanisms that can be used to convert cellular service credentials on a physical SIM (pSIM) card, e.g., a UICC, included in a wireless device to an electronic SIM (eSIM) on an embedded universal integrated circuit card (eUICC) of the wireless device. Transfer of credentials for cellular service access can occur within the wireless device with authorization to transfer obtained from a mobile network operator (MNO) entitlement server associated with the pSIM. A new eSIM corresponding to the pSIM can be downloaded to the eUICC from a provisioning server of the MNO and installed on the eUICC of the wireless device. In some cases, the pSIM of the wireless device includes credentials on the pSIM that do not provide access to particular services or capabilities of a cellular wireless network or cannot be updated using an over-the-air (OTA) update mechanism to provide access to the particular services and/or capabilities. In some embodiments, access to one or more features of a fifth generation (5G) cellular wireless network are enabled for the wireless device by converting the pSIM credentials to eSIM credentials on the eUICC of the wireless device. In some embodiments, access to a 5G standalone (SA) cellular wireless network is enabled by conversion of the pSIM to the eSIM. In some embodiments, the 5G SA cellular wireless network provides improved privacy by encryption of the subscriber identity, e.g., by use of an encrypted subscription concealed identifier (SUCI) instead of an unencrypted subscriber permanent identifier (SUPI) to communicate with and access services of a cellular wireless network. In some embodiments, the new eSIM provides for use of a SUCI for communication with a 5G cellular wireless network in place of a SUPI used by the pSIM. In some embodiments, conversion of the credentials from the pSIM to the eSIM provides for access to packet voice services, such as Internet Protocol (IP) Multimedia Subsystem (IMS) voice over next generation radio (VoNR) services of a 5G cellular wireless network. In some embodiments, conversion of the credentials from the pSIM to the eSIM provides for access to cellular services of a first wireless network via the eSIM and access to cellular services of a second wireless network via substitution of the pSIM card, e.g., a first UICC, in a SIM tray of the wireless device with a different pSIM card, e.g., a second UICC. In some embodiments, the wireless device determines whether a set of criteria are satisfied to convert credentials of a pSIM included in the wireless device to an eSIM on an eUICC of the wireless device. The set of criteria can include one or more of: i) whether an MNO associated with the eSIM supports a 5G SA mode, ii) whether the wireless device supports the 5G SA mode, iii) whether a 5G cellular wireless network is available to the wireless device, iv) whether the MNO supports conversion of the pSIM to an eSIM locally on the wireless device, v) whether a SUCI capability is unavailable on the pSIM of the wireless device, vi) whether a passcode security mechanism is enabled on the wireless device, or vii) whether a wireless connection other than via the pSIM, e.g., a non-cellular wireless connection, is available to the wireless device. When all or a subset of the set of criteria are satisfied and after obtaining user consent, the wireless device can perform conversion of the credentials of the pSIM to an eSIM on the wireless device. Conversion includes downloading a new eSIM from an MNO provisioning server and installing the new eSIM on the eUICC of the wireless device. Following conversion of the pSIM to the eSIM, the wireless device can disable the previously used pSIM, mark the previously used pSIM as converted, and register a corresponding eSIM software stack of the wireless device with a 5G SA cellular wireless network of the MNO. In some embodiments, one or more used-defined setting preferences associated with the previously used pSIM are transferred to the newly installed eSIM on the wireless device.

These and other embodiments are discussed below with reference to FIGS. 1 through 13; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, a group of base stations 112-1 to 112-n that are managed by different Mobile Network Operators (MNOs) 114, and a set of provisioning servers 116 that are in communication with the MNOs 114. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific services (e.g., voice and data) to which the mobile wireless device 102 can be subscribed.

As shown in FIG. 1, the mobile wireless device 102 can include processing circuitry, which can include a processor 104 and a memory 106, an embedded Universal Integrated Circuit Card (eUICC) 108, and baseband wireless circuitry 110. In some embodiments, the mobile wireless device 102 includes one or more physical Subscriber Identity Module (SIM) cards (not shown) in addition to or substituting for the eUICC. The components of the mobile wireless device 102 work in conjunction to enable the mobile wireless device 102 to provide useful features to a user of the mobile wireless device 102, such as localized computing, location-based services, and Internet connectivity. The eUICC 108 can be configured to store multiple electronic SIMs (eSIMs) for accessing different MNOs 114 through the base stations 112-1 to 112-n. For example, the eUICC 108 can be configured to store and manage one or more eSIMs for one or more MNOs 114 for different subscriptions to which the mobile wireless device 102 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
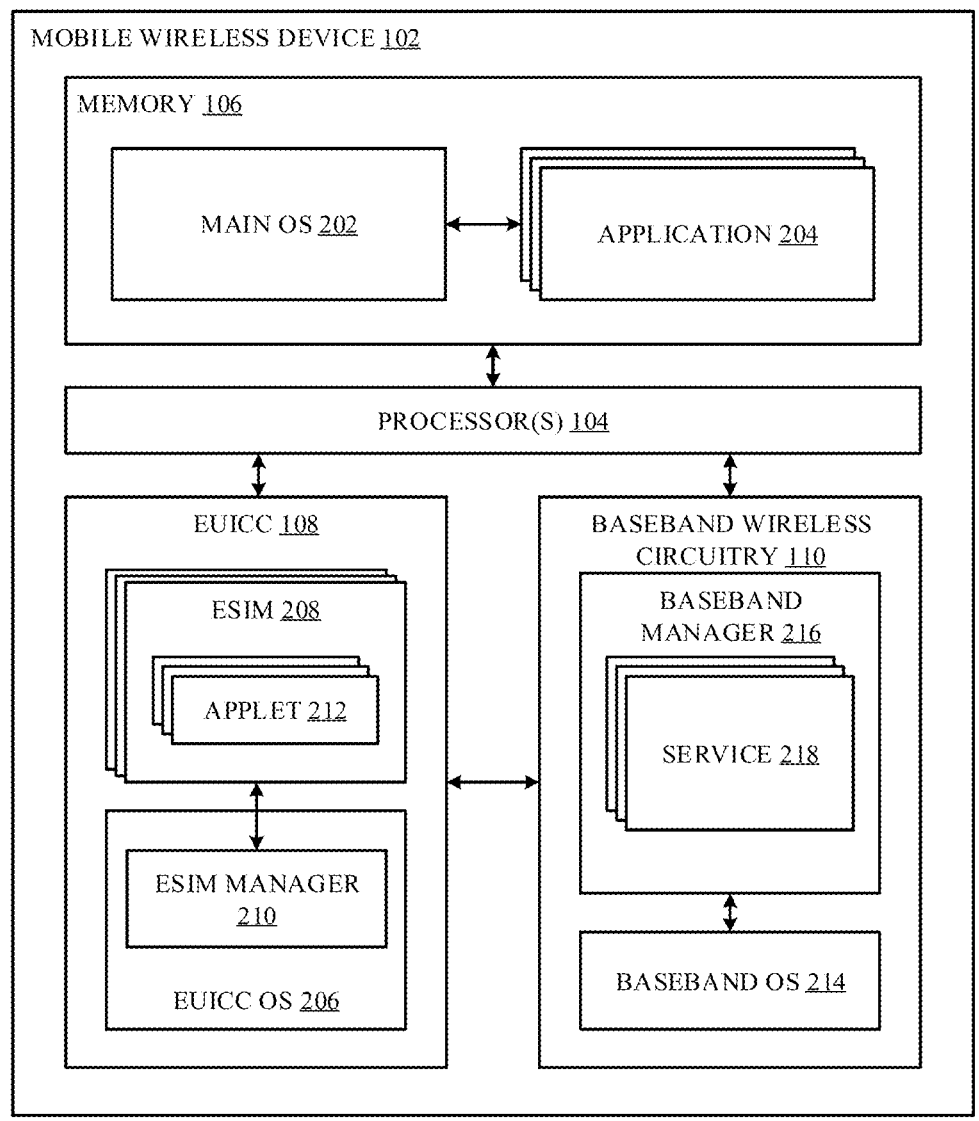
FIG. 2 illustrates a block diagram of a more detailed view of particular components of the mobile wireless device of FIG. 1, according to some embodiments.

FIG. 2 illustrates a block diagram of a more detailed view 200 of particular components of the mobile wireless device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the wireless circuitry 110 with access to the eSIMs 208 to provide access to wireless services for the mobile wireless device 102. The eUICC 108 OS can include an eSIM manager 210, which can perform management functions for various eSIMs. According to the illustration shown in FIG. 2, each eSIM 208 can include a number of applets 212 that define the manner in which the eSIM 208 operates. For example, one or more of the applets 212, when implemented by the baseband wireless circuitry 110 and the eUICC 108, can be configured to enable the mobile wireless device 102 to communicate with an MNO 114 and provide useful features (e.g., phone calls and internet) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
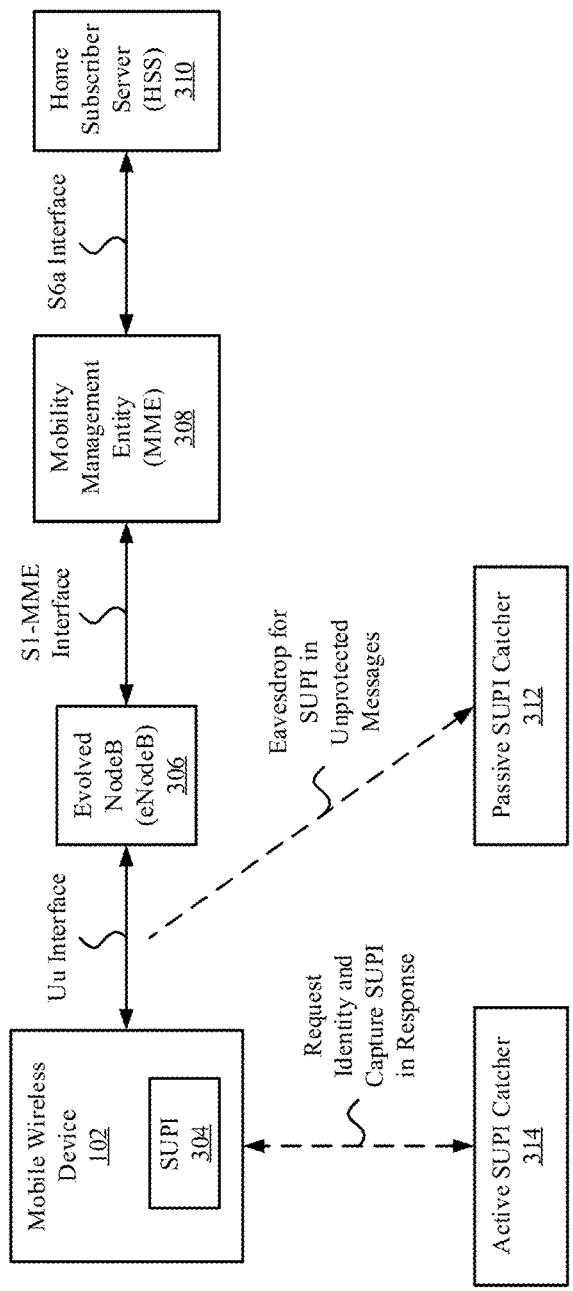
FIG. 3A illustrates a block diagram of an exemplary system subject to capture of subscriber identities, according to some embodiments.

FIG. 3 illustrates a block diagram 300 of an exemplary system subject to capture of subscriber identities. The system includes a mobile wireless device 102, which includes an unencrypted subscription permanent identifier (SUPI) 304 by which a subscription for a user of the mobile wireless device 102 can be uniquely identified, in communication with an exemplary cellular wireless network entity, namely an evolved NodeB (eNodeB) 306. An example of a SUPI 304 includes an international mobile subscriber identity (IMSI). The mobile wireless device 102 and the eNodeB 306 can communicate via a Uu interface, which for some messages or for certain periods of time, such as prior to establishment of a secure connection between the mobile wireless device 102 and the eNodeB 306, can be subject to eavesdropping by a third party. While the eNodeB 306 connects to a Mobility Management Entity (MME) 308 of the core network via a secure S1-MME interface, and the MME 308 connects to a Home Subscriber Server (HSS) 310 via a secure S6a interface, the eNodeB 306 can send some messages to and receive some messages from the mobile wireless device 102 "in the clear", in some instances. For example, a Radio Resource Control (RRC) paging message sent from the eNodeB 306 to the mobile wireless device 102 can include the SUPI 304 of the mobile wireless device 102 in an unprotected manner. Similarly, certain RRC network access stratum (NAS) messages send from the mobile wireless device 102 to the eNodeB 306 can also include the SUPI 304 of the mobile wireless device 102 without using encryption to protect the SUPI 304 from eavesdroppers. Example RRC NAS messages include an RRC Attach Request message, a UE originating RRC Detach Request message, and an RRC Identity Response message. A passive eavesdropping entity, such as passive SUPI catcher 312, can listen for communication sent from the eNodeB 306, such as paging messages, or sent from the mobile wireless device 102, such as attach/detach request messages, and ascertain the SUPI 304 of the mobile wireless device 102. In addition, an active eavesdropping entity, such as active SUPI catcher 314, can mimic communication from the eNodeB 306 and send a Request Identity message to the mobile wireless device 102 and receive an Identity Response message that includes the SUPI 304 of the mobile wireless device 102. The Uu interface between the mobile wireless device 102 and the eNodeB 306 is susceptible to SUPI exposure due to passive and/or active attacks. By having the mobile wireless device 102 and the eNodeB 306 securely encrypt at least a portion of the SUPI 304, such as the mobile subscriber identification number (MSIN), when communicating over an insecure communication link, the SUPI 304 can be protected from eavesdropping. Moreover, with the use of one-time use, ephemeral public/secret key pairs, the SUPI 304 can be protected from future decryption should a previously used secret key be compromised. Identity privacy protection can apply to any messages that include a globally unique mobile subscriber identifier that is communicated between the mobile wireless device 102 and a cellular wireless network entity, including over insecure connections susceptible to eavesdropping. Examples of a wireless network entity include a radio access network entity, such as the eNodeB 306 or a next generation NodeB (also referred to as a gNodeB or gNB), or a core network entity, such as the MME 308, the HSS 310, an authentication server function (AUSF), or an access and mobility function (AMF). The messages may include a mobile subscriber identifier, such as the MSIN of the SUPI 304, which can be encrypted securely to protect privacy of the mobile subscriber identifier. An encrypted version of the SUPI 304 can be referred to as a subscription concealed identifier (SUCI). Access to using a SUCI for communication with a cellular wireless network rather than a SUPI can be preferred by a user to improve privacy protection of the user's identity.

Figure 3B:
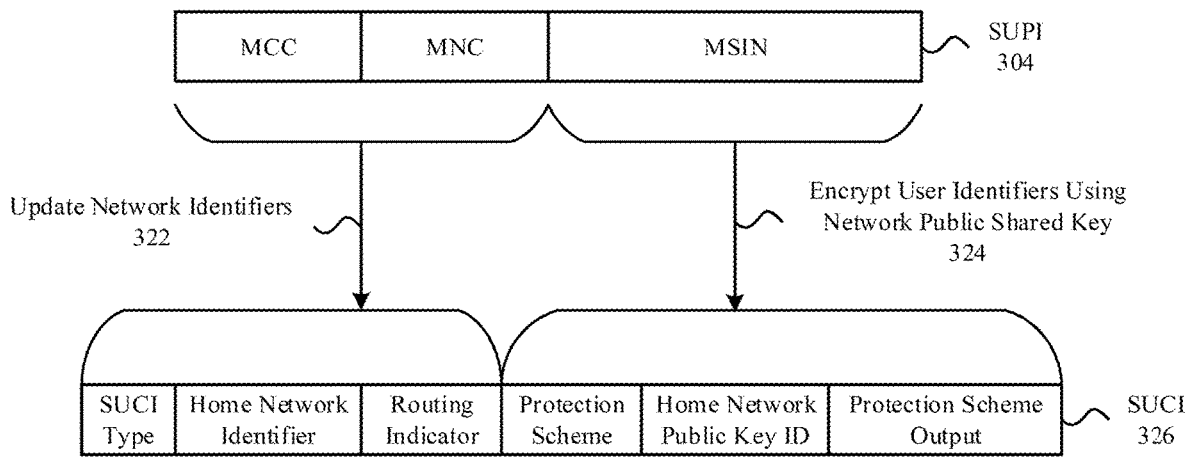
FIG. 3B illustrates a diagram of an example of 5G standalone (SA) cellular wireless network user identity privacy protection, according to some embodiments.

FIG. 3B illustrates a diagram 320 of 5G standalone (SA) cellular wireless network user identity privacy protection. A SUPI 304 of a mobile wireless device 102 can include a home network identifier, such as a mobile country code (MCC), indicating a home country in which the cellular wireless network operates, and a mobile network code (MNC) identifying the specific cellular wireless network of a mobile network operator (MNO) that is a home network with which the mobile wireless device 102 is associated. The SUPI 304 can further include a subscriber specific identifier, e.g., a mobile subscriber identification number (MSIN). Rather than include the SUPI 304 in messages communicated to a cellular wireless network, the eUICC 108 of the mobile wireless device 102 can create an encrypted SUCI 326 that is based on the SUPI 304 instead, e.g., as indicated by the encryption 324. The SUCI 326 can include an updated network identifier 322 that includes a SUCI type value, a home network identifier, and a routing indicator. When the SUCI type value indicates an international mobile subscriber identity (IMSI), the home network identifier can include the MCC and MNC values. When the SUCI type value indicates a network access identifier (NAI), the home network identifier can include a domain name. The SUCI 326 can further include an encrypted version of the MSIN extracted from the SUPI 304 and generated using a network public shared encryption key. The SUCI 326 can include a protection scheme identifier value, a home network public key identifier value that indicates the network public shared encryption key used to generate a protection scheme output that can be decrypted by the network to identify the subscriber. In some embodiments, the mobile wireless device 102 can be configured to use a SUCI 326 when communicating with a 5G SA cellular wireless network. In some embodiments, conversion of a pSIM to an eSIM 208 on the eUICC 108 of the mobile wireless device 102 can provide for use of a SUCI 326 without requiring replacement of the pSIM on the mobile wireless device 102. In some embodiments, conversion of a pSIM to an eSIM 208 on the eUICC 108 of the mobile wireless device 102 can provide for use of a SUCI 326 without requiring an OTA update of a pSIM on the mobile wireless device 102.

Figure 4A:
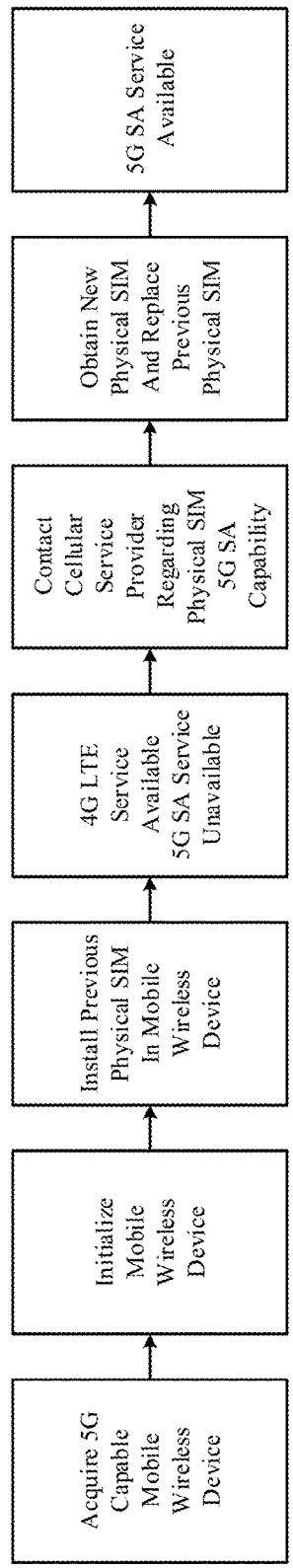
FIG. 4A illustrates a flowchart of a scenario to enable 5G SA cellular capability for a mobile wireless device, according to some embodiments.

FIG. 4A illustrates a flowchart 400 of a set of steps that can be undertaken to enable 5G SA cellular wireless device for a mobile wireless device 102 by replacement of a pSIM. The user may acquire and initialize a 5G capable mobile wireless device 102. The user may install a pSIM from a previously used mobile wireless device 102, e.g., a non-5G capable mobile wireless device 102. After installing the pSIM, 5G cellular wireless service may be unavailable as the pSIM may not be enabled to support access to 5G cellular wireless services, and instead a non-5G cellular wireless devices, such as a 4G LTE cellular wireless service may be available on the mobile wireless device 102. The user can contact the MNO associated with the pSIM to obtain information regarding capability of the pSIM to access 5G SA cellular wireless services. The user can be advised to obtain a new pSIM to replace the previously used pSIM in the mobile wireless device 102, and after installation of the new pSIM, 5G cellular wireless services may be enabled for the mobile wireless device 102. Replacement of the pSIM, however, can require visiting a sales outlet of the MNO or waiting for delivery of a replacement pSIM. Conversion of the credentials of a pSIM to a 5G capable eSIM on the mobile wireless device 102 can provide a superior user experience when upgrading the mobile wireless device 102 to obtain access to one or more 5G cellular wireless services and/or capabilities provided thereby.

Figure 4B:
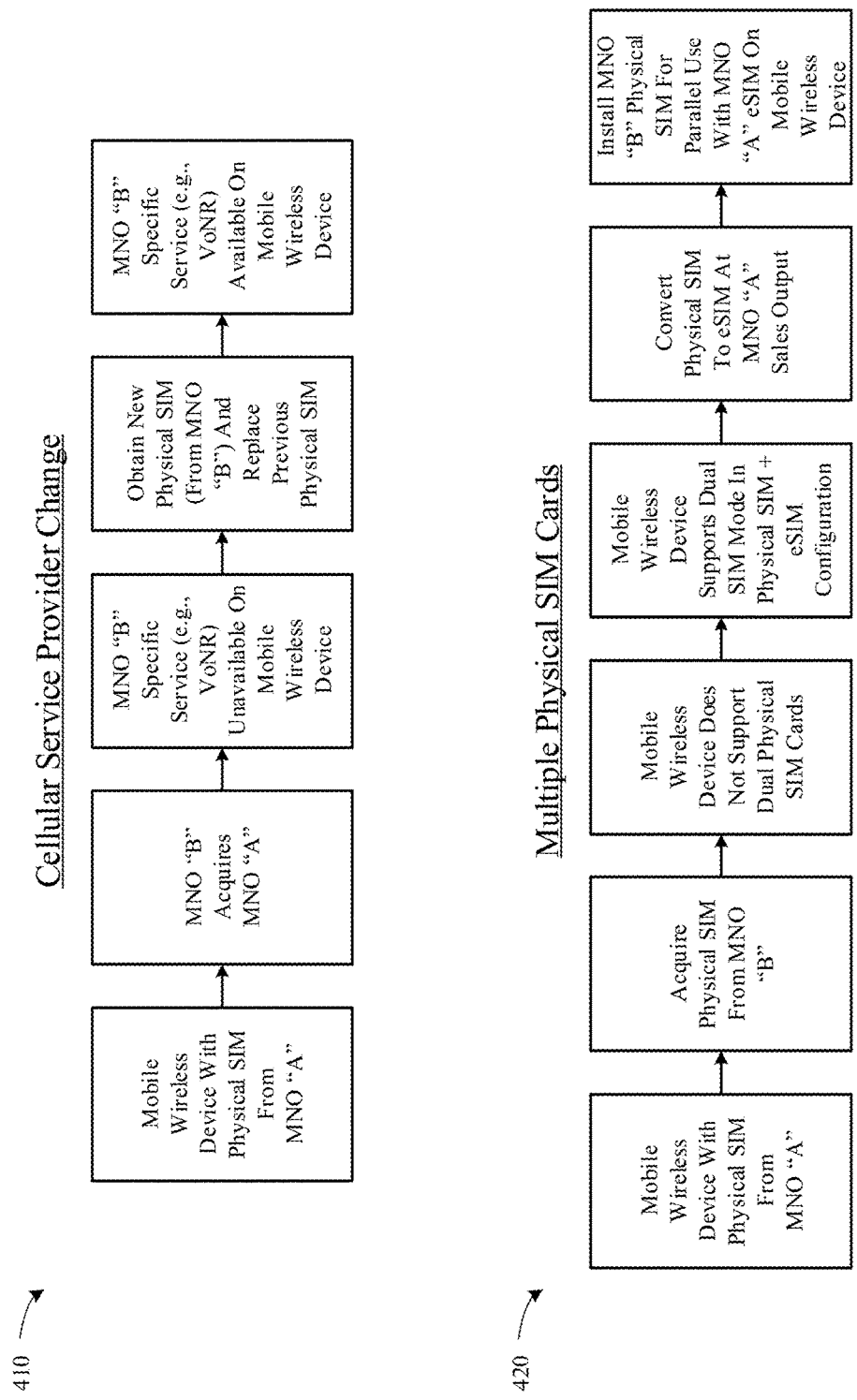
FIG. 4B illustrates diagrams of additional exemplary scenarios that can benefit from pSIM to eSIM conversion on a mobile wireless device, according to some embodiments.

FIG. 4B illustrates diagrams 410, 420 of scenarios in which a user can benefit from pSIM to eSIM conversion on a mobile wireless device 102. In the first diagram 410, a cellular service provider for the mobile wireless device 102 can change, e.g., when MNO "B" acquires MNO "A" with which a pSIM in the mobile wireless device 102 is associated. MNO "B" can offer a specific cellular wireless service that may have been previously unavailable to the user via MNO "A" on the mobile wireless device 102. For example, MNO "B" may provide a voice over next generation radio (VoNR) service. In some cases, the pSIM, previously associated with MNO "A", may be unable to be used and/or updated using an OTA mechanism to allow for access to the VoNR service. The user of the mobile wireless device 102 can obtain a new pSIM from MNO "B" and replace the previously used pSIM in the mobile wireless device 102 to obtain access to the VoNR service. In the second diagram 420, a user of a mobile wireless device 102 can seek to access cellular wireless services from MNO "A", with which a first pSIM in the mobile wireless device 102 can be associated, and also to access cellular wireless services from MNO "B", with which a second pSIM can be associated, such as when roaming to a visited country and the second pSIM is for access to cellular wireless services of MNO "B" in the visited country. The mobile wireless device 102 can include a tray that supports use of only one pSIM at a time. Replacement of the pSIM in the mobile wireless device 102 can only provide access to cellular wireless services of one cellular service provider, e.g., MNO "A" or MNO "B", at a time. The mobile wireless device 102, however, in some cases, can support a dual SIM mode in a configuration that combines a pSIM and an eSIM at the same time. The user can seek to convert the pSIM for MNO "A" to an eSIM 208 on the eUICC 108 of the mobile wireless device 102. Conversion can be accomplished at a sales outlet of MNO "A" after which the pSIM from MNO "B" can be inserted into the mobile wireless device 102. In both scenarios shown in FIG. 4B, as with the scenario described for FIG. 4A, replacement of a pSIM can require additional less preferred actions for a user to enable access to new services. Instead, on-device conversion of a pSIM to an eSIM 208 as described herein can be preferred.

Figure 5:
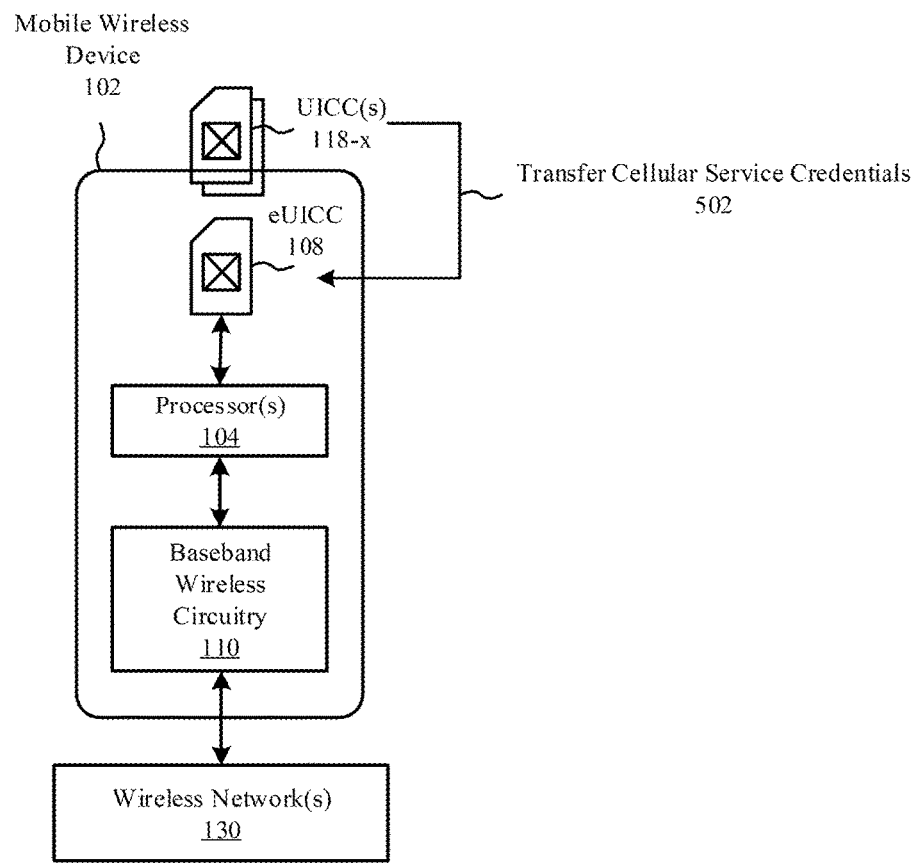
FIG. 5 illustrates a diagram for on-device pSIM to eSIM conversion, according to some embodiments.

FIG. 5 illustrates a diagram 500 of on-device pSIM to eSIM 208 conversion. The mobile wireless device 102 can include one or more UICC(s) 118-x on which one or more pSIMs are stored. The mobile wireless device 102 can also include an eUICC 108 that is configured to store one or more eSIMs 208. A user of the mobile wireless device 102 can seek to transfer cellular service credentials on the device as indicated by 502 from one or more pSIMs to one or more eSIMs 208 on the eUICC 108. In some embodiments, the user of the mobile wireless device 102 can initiate conversion of a pSIM to an eSIM 208 on the mobile wireless device 102. In some embodiments, a mechanism in the mobile wireless device 102 can determine conditions under which conversion of a pSIM to an eSIM 208 for the mobile wireless device 102 can occur. When conditions are met, the mobile wireless device 102 can determine compatibility of a cellular wireless network associated with a pSIM to determine whether conversion to an eSIM 208 is feasible. In some embodiments, when both the mobile wireless device 102 and a cellular wireless network associated with a pSIM supports conversion of the pSIM to an eSIM 208 and a data connection is available other than via the pSIM, the mobile wireless device 102 can perform a conversion of the pSIM to an eSIM when acceptance to proceed with the conversion is obtained from a user of the mobile wireless device 102. Conversion of the pSIM to the eSIM can occur locally on the mobile wireless device 102 without requiring a user of the mobile wireless device 102 to replace the pSIM on the mobile wireless device 102 or to visit a sales outlet of an MNO 114 associated with the pSIM.

Figure 6A:
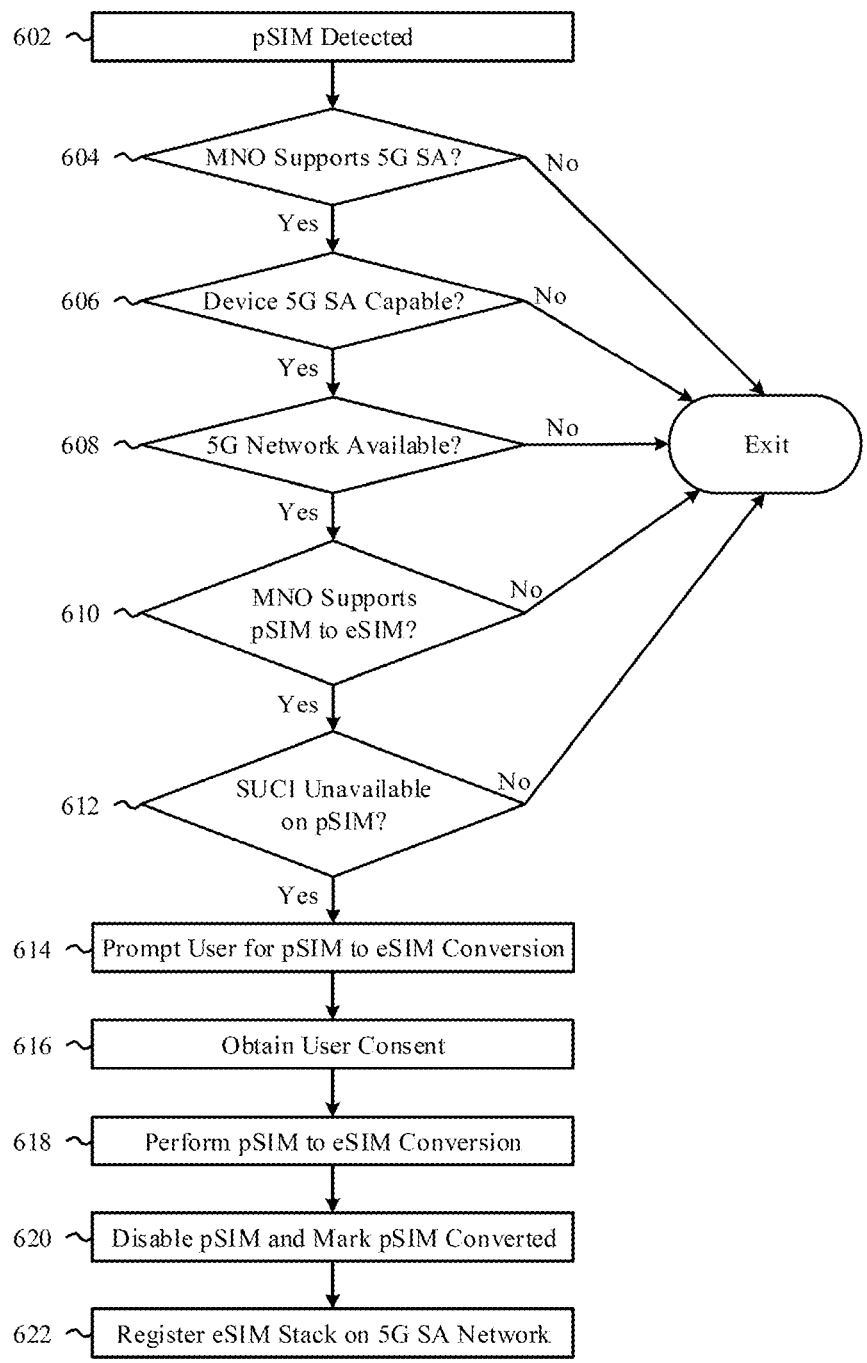
FIG. 6A illustrates a flowchart of an exemplary set of actions taken by a mobile wireless device for on-device pSIM to eSIM conversion, according to some embodiments.

FIG. 6A illustrates a flowchart 600 of actions that can be undertaken to convert cellular wireless service credentials of a pSIM included in a mobile wireless device 102 to credentials on an eSIM 208 on an eUICC 108 of the mobile wireless device 102. At 602, the mobile wireless device 102 can detect the presence of a pSIM in the mobile wireless device 102. The mobile wireless device can then determine whether a set of criteria for conversion of the pSIM to an eSIM 208 are met, including a number of individual conditions as described herein. In some embodiments, one or more (or all) of the criteria must be met for conversion of the pSIM to an eSIM 208 to occur. At 604, the mobile wireless device 102 can determine whether an MNO 114 associated with the pSIM supports a 5G standalone (SA) mode, e.g., based on information obtained from a carrier bundle included in the mobile wireless device 102. At 606, the mobile wireless device 102 determines whether the mobile wireless device 102 is capable of supporting 5G cellular wireless service. At 608, the mobile wireless device 102 determines whether a 5G cellular wireless network of the MNO 114 associated with the pSIM is available in a location at which the mobile wireless device 102 is operating. At 610, the mobile wireless device 102 determines whether the MNO 114 supports conversion of the pSIM to an eSIM 208 on the mobile wireless device 102. At 612, the mobile wireless device 102 determines whether support for use of a SUCI 326 is not provided by the pSIM, e.g., when encryption of a SUPI 304 to generate a SUCI 326 cannot be performed by the UICC 118, such as when the pSIM on the UICC 118 lacks requisite encryption keys from the MNO 114 to perform the encryption. In some embodiments, when at least one of the criteria illustrated by actions 604, 606, 608, 610, and 612 is not met, the conversion procedure can be halted. In some embodiments, when each of the criteria illustrated by actions 604, 606, 608, 610, and 612 are met, the mobile wireless device 102 can determine that conversion of the pSIM to an eSIM 208 is available and, at 614, provide a prompt to a user of the mobile wireless device 102, e.g., via a display or other input/output mechanism of the mobile wireless device 102, to request consent to convert the pSIM to an eSIM 208. At 616, the mobile wireless device 102 can obtain user consent to proceed with conversion, and at 618, the mobile wireless device 102 can proceed with conversion of the pSIM to an eSIM 208 on an eUICC 108 of the mobile wireless device 102. Details of pSIM to eSIM 208 conversion are described further herein. At 620, the mobile wireless device 102, after conversion of the pSIM to an eSIM 208 completes, can disable the pSIM and mark the pSIM as converted. At 622, the mobile wireless device 102 can register an eSIM 208 software stack for the converted credentials with a 5G SA cellular wireless network of the MNO 114 associated with the newly installed eSIM 208 (and previously associated with the pSIM). The actions illustrated in FIG. 6A provide a mechanism in which conversion of a pSIM to an eSIM 208 for a user of a mobile wireless device 102 can be effected when a user seeks to use a 5G cellular wireless service with enhanced identity privacy protection afforded by use of a SUCI 326 with a 5G SA cellular wireless network, and an existing pSIM of the mobile wireless device 102 cannot provide the capability.

Figure 6B:
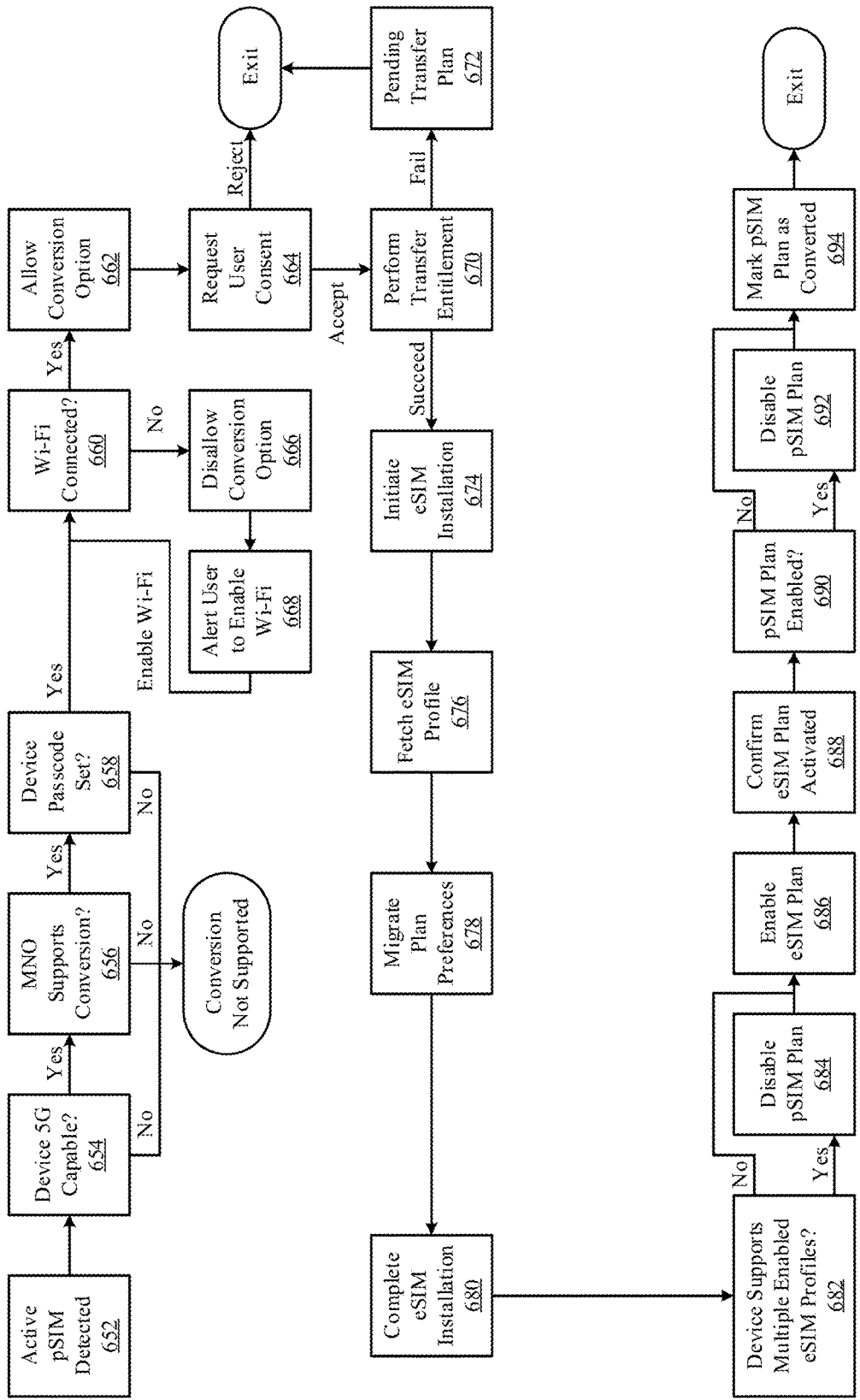
FIG. 6B illustrates another flowchart of an exemplary set of actions taken by a mobile wireless device for on-device pSIM to eSIM conversion, according to some embodiments.

FIG. 6B illustrates another flowchart 650 for conversion of a pSIM to an eSIM 208 on a mobile wireless device 102. At 652, the mobile wireless device 102 detects the presence of an active pSIM in the mobile wireless device 102. At 654, the mobile wireless device 102 determines whether the mobile wireless device 102 supports 5G cellular wireless service. At 656, the mobile wireless device 102 determines whether the MNO 114 associated with the active pSIM of the mobile wireless device 102 supports conversion of the pSIM to an eSIM 208 on an eUICC 108 of the mobile wireless device 102. At 658, the mobile wireless device 102 determines whether the mobile wireless device 102 is passcode protected, to reduce the opportunity for inadvertent pSIM to eSIM 208 conversion on the mobile wireless device 102. In some embodiments, when any one of the conditions at 654, 656, or 658 are not met, the mobile wireless device 102 can determine that conversion of the pSIM to an eSIM 208 is not supported. In some embodiments, when all conditions at 654, 656, and 658 are met, the mobile wireless device 102, at 660, determines whether a data connection is available to the mobile wireless device 102 using a mechanism other than via the pSIM, e.g., whether a non-cellular wireless connection, such as a Wi-Fi® connection, is available to the mobile wireless device 102. When a non-cellular wireless connection is not available, at 666, the mobile wireless device 102 can disallow an option for conversion of the pSIM to the eSIM 208 to be displayed (e.g., by greying out or otherwise making un-selectable such an option in a user interface of the mobile wireless device 102). At 668, the mobile wireless device 102 provides an alert to a user of the mobile wireless device 102 to indicate that a non-cellular wireless connection must be available for conversion of the pSIM to the eSIM 208 to occur. In some embodiments, a Wi-Fi connection can be required for conversion of the pSIM to the eSIM 208 to occur, and the mobile wireless device 102 can alert the user to enable Wi-Fi. Once Wi-Fi is enabled, the mobile wireless device 102 can check that the Wi-Fi connection is available (repeating the action at 660), and when the Wi-Fi connection is available, the mobile wireless device 102, at 662, can allow the option for conversion of the pSIM to an eSIM 208 to be available, e.g., by displaying a "convert to eSIM" option to a user of the mobile wireless device 102. At 664, the mobile wireless device 102 can request user consent to proceed with conversion of the pSIM to an eSIM 208. When the user does not provide consent, the process can exit. When the user provides consent for conversion, at 670, the mobile wireless device 102 can perform one or more actions to transfer cellular service credentials for the pSIM profile to a new eSIM 208 profile. The one or more actions can include requests for transfer sent to an MNO entitlement server. When transfer fails, at 672, the mobile wireless device 102 can create a pending transfer of the pSIM profile to an eSIM 208 profile and subsequently exit the conversion. When transfer succeeds, at 674, the mobile wireless device 102 can initiate installation of a new eSIM 208 from an MNO provisioning server 116, where the cellular service credentials for the pSIM are now transferred to the new eSIM 208. At 676, the mobile wireless device 102 downloads the new eSIM 208 from the MNO provisioning server 116 and installs the new eSIM 208 on the eUICC 108 of the mobile wireless device 102. At 678, in some embodiments, the mobile wireless device 102 migrates user-defined plan preferences, e.g., settings from the previous pSIM profile, to the new eSIM 208 installed on the eUICC 108. At 680, the mobile wireless device can determine that installation of the new eSIM 208 has completed. At 682, the mobile wireless device 102 determines whether multiple, parallel eSIMs 208 can be simultaneously enabled on the mobile wireless device 102. When multiple enabled eSIMs 208 are supported by the mobile wireless device 102, at 684, the mobile wireless device 102 disables the pSIM profile. When multiple enabled eSIMs 208 are not supported by the mobile wireless device 102, the mobile wireless device delays disabling the pSIM profile. This precaution ensures that the pSIM is not disabled before confirmation of successful activation of the eSIM 208 occurs. When only one eSIM 208 can be active on the eUICC 108 of the mobile wireless device 102 at a time, any other active eSIM 208 on the eUICC 108 can be de-activated when the newly installed eSIM 208 is activated. At 686, the mobile wireless device 102 enables the newly installed eSIM 208 profile, and at 688, the mobile wireless device 102 confirms that the eSIM 208 profile has been activated successfully. In some embodiments, the mobile wireless device 102 confirms successful activation of the eSIM 208 profile based on receipt of a message from a network-based server of the MNO 114, such as an MNO entitlement server or an MNO provisioning server 116. At 690, the mobile wireless device 102 determines whether the pSIM profile is still enabled, and at 692, the mobile wireless device 102 disables the pSIM profile, if required. At 694, the mobile wireless device 102 marks the pSIM profile as converted.

Figure 7A:
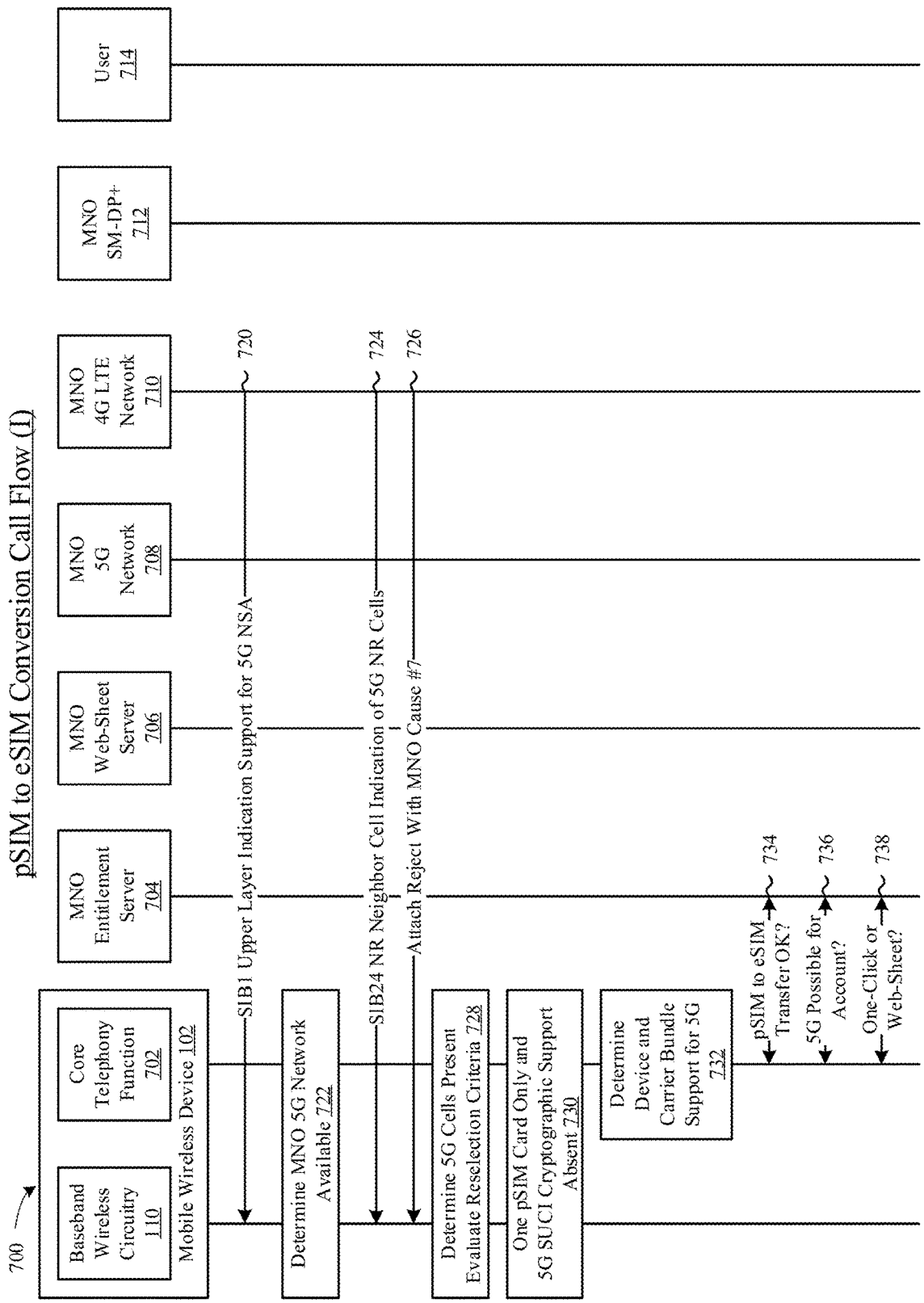
FIGS. 7A and 7B illustrate diagrams of an exemplary call flow to convert a pSIM to an eSIM in a mobile wireless device, according to some embodiments.
Figure 7B:
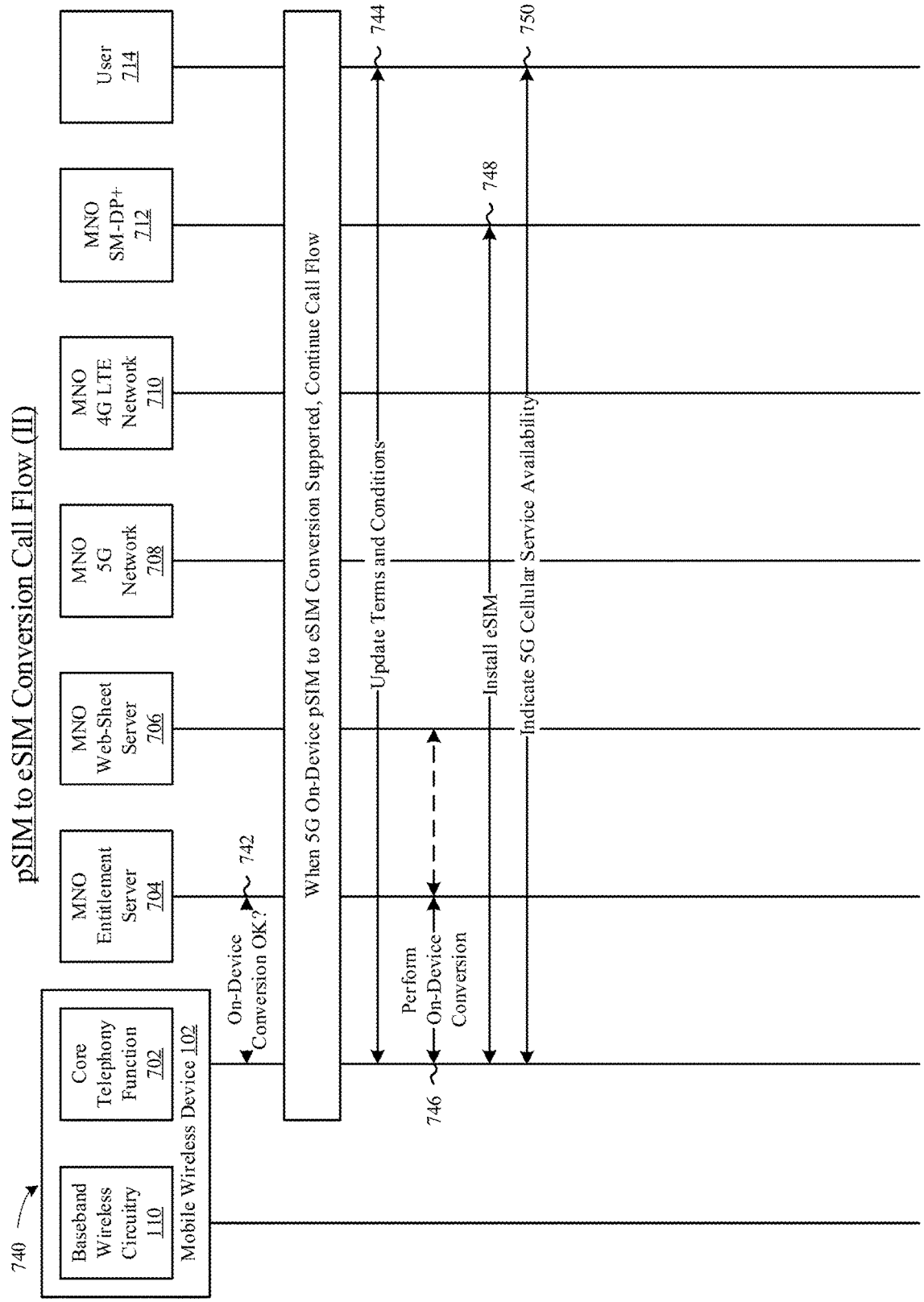

FIGS. 7A and 7B illustrate diagrams 700, 740 of an exemplary call flow to convert a pSIM profile to an eSIM 208 profile in a mobile wireless device 102. At 720, baseband wireless circuitry 110 of the mobile wireless device 102 can receive one or more system information broadcast (SIB) messages from a 4G LTE network 710 of an MNO 114, e.g., a SIB1 message, where the one or more SIB messages indicate support for a 5G non-standalone (NSA) mode. In a 5G non-standalone (NSA) mode, an enhanced packet core (EPC) of a 4G LTE network interfaces with a 5G next generation radio (NR) access network. In a 5G standalone (SA) mode, a 5G core network interfaces with the 5G NR access network. The broadcast SIB1 message from the MNO 4G LTE network 710, which can be a 4G radio access network in parallel with a 5G radio access network 708 of the same MNO 114, can indicate that 5G NSA is available, and therefore 5G NR access network nodes are available. At 722, the mobile wireless device 102 determines based on the SIB1 message that the MNO 5G radio access network 708 is available. At 724, the mobile wireless device 102 can receive additional SIB messages from the MNO 4G LTE network 710, e.g., a SIB24 message indicating the presence of next generation radio (NR) 5G neighbor cells. At 726, the mobile wireless device 102 can also receive an attach reject message that includes a particular rejection cause value, e.g., cause #7. At 728, the mobile wireless device 102 can determine based on one or more received SIB messages from the MNO 4G LTE network 710 that one or more 5G NR cells are available in a location in which the mobile wireless device 102 is operating. The mobile wireless device 102, at 728, can further evaluate re-selection criteria broadcast by the MNO 4G LTE network 710 and determine the presence of suitable 5G NR cells. Based on the evaluation of the SIB messages and re-selection criteria, the mobile wireless device 102 can conclude that a suitable 5G cellular wireless access network is available. At 730, the mobile wireless device 102 determines i) whether a UICC 118 having only a single pSIM is included in the mobile wireless device 102 and ii) that support for 5G SUCI cryptographic encryption is not available via the single pSIM on the UICC 118 included in the mobile wireless device 102. When the 5G radio access network is present (as determined at least at 728) and 5G SUCI support is absent for a single pSIM (as determined at least at 730), the mobile wireless device 102, at 732, determines whether the mobile wireless device 102 (e.g., hardware/software/firmware) supports 5G cellular wireless services and whether a carrier bundle (software/firmware from an MNO 114 associated with the pSIM) indicates support for 5G cellular wireless services. After checking that the mobile wireless device 102 hardware/software/firmware supports pSIM to eSIM 208 conversion and 5G service, the mobile wireless device 102, at 734, queries an MNO entitlement server 704 to determine whether a pSIM to eSIM 208 transfer of credentials is supported by the MNO 114 associated with the pSIM. The mobile wireless device 102, at 736, further queries the MNO entitlement server 704 to determine that the cellular wireless account associated with the mobile wireless device 102 supports 5G cellular wireless service. The mobile wireless device 102, at 738, additionally queries the MNO entitlement server 704 to determine whether transfer of the credentials from the pSIM to the eSIM 208 can use a one-click procedure that does not require login via an MNO web-sheet server 706 or transfer uses a procedure that requires direct interaction with the MNO web-sheet server 706. At 742, the mobile wireless device 102 determines whether conversion of the pSIM to the eSIM 208 locally on the mobile wireless device 102 is supported. When all of the previously checked criteria are satisfied to ensure that on-device pSIM to 5G eSIM conversion is supported by both the mobile wireless device 102 and the MNO 114 cellular wireless network, the mobile wireless device 102 continues with the call flow for the conversion. At 744, a core telephony function 702 of the mobile wireless device 102 can interact with a user 714 of the mobile wireless device 102, such as to present and obtain i) consent for updated terms and conditions associated with use of a new eSIM 208 to be downloaded to and installed on the eUICC 108 of the mobile wireless device 102, ii) agreement to conversion of the pSIM to the new eSIM 208, iii) agreement to use 5G cellular wireless services, or the like. In some embodiments, when the user 714 does not subscribe to 5G cellular wireless services, the core telephony function 702 can present options for upgrading to 5G cellular wireless services. At 746, the core telephony function 702 exchanges messages with the MNO entitlement server 704 to transfer credentials for on-device conversion of the pSIM on the UICC 118 of the mobile wireless device to an eSIM 208 downloadable to the eUICC 108 of the mobile wireless device 102. In some embodiments, the mobile wireless device 102 and/or the MNO entitlement server 704 communicate with the MNO web-sheet server 706 as part of the transfer of credentials for conversion of the pSIM to the eSIM 208. At 748, the mobile wireless device 102 downloads from an MNO provisioning server 116, e.g., MNO SM-DP+ 712 server, the eSIM 208 and installs the downloaded eSIM 208 on the eUICC 108 of the mobile wireless device 102. At 750, the mobile wireless device 102 provides an indication to the user 714 of the mobile wireless device 102 that 5G cellular wireless services associated with the newly installed eSIM 208 is available.

Figure 8A:
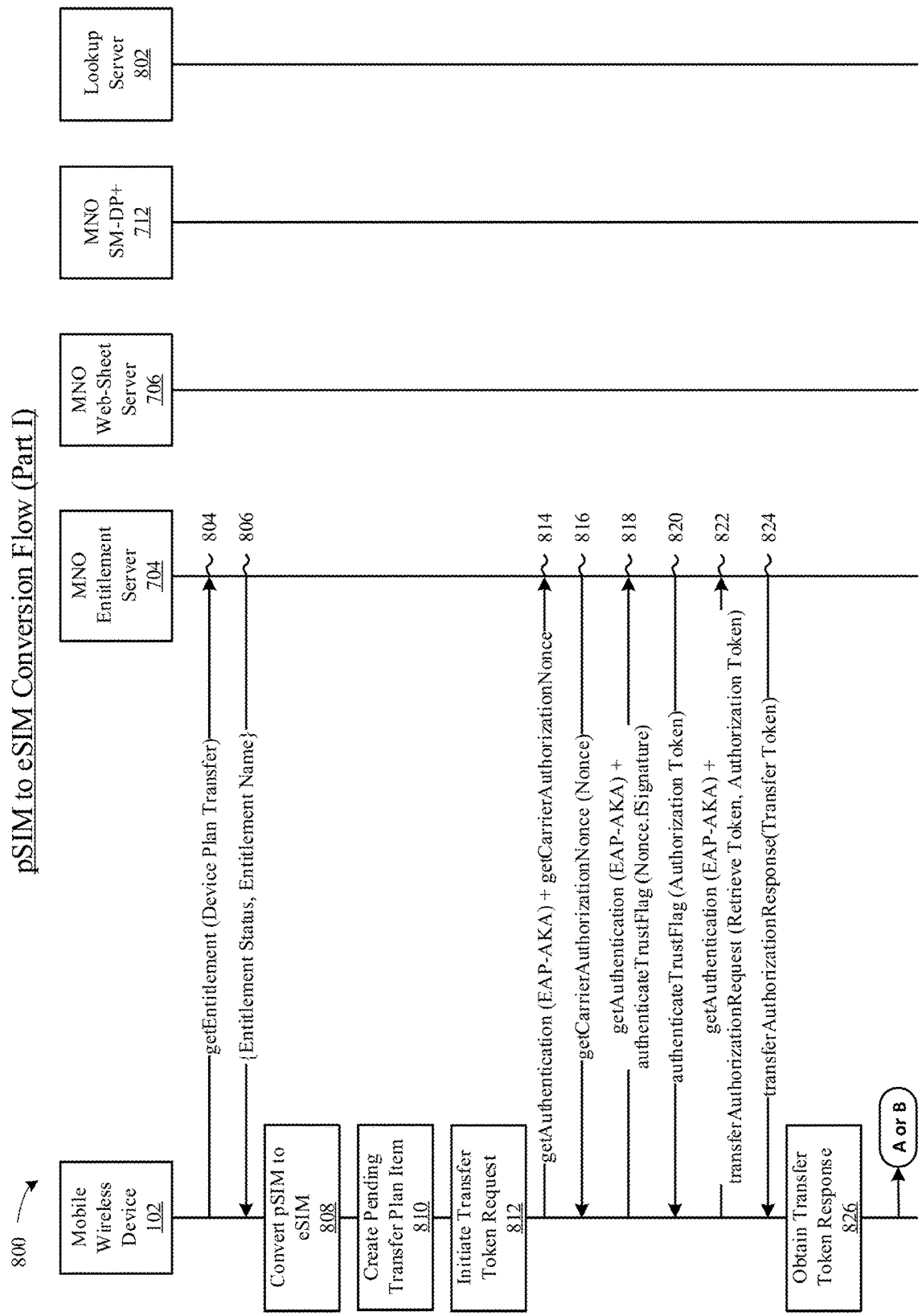
FIGS. 8A, 8B, and 8C illustrate additional diagrams of exemplary call flows for pSIM to eSIM conversion in a mobile wireless device, according to some embodiments.
Figure 8B:
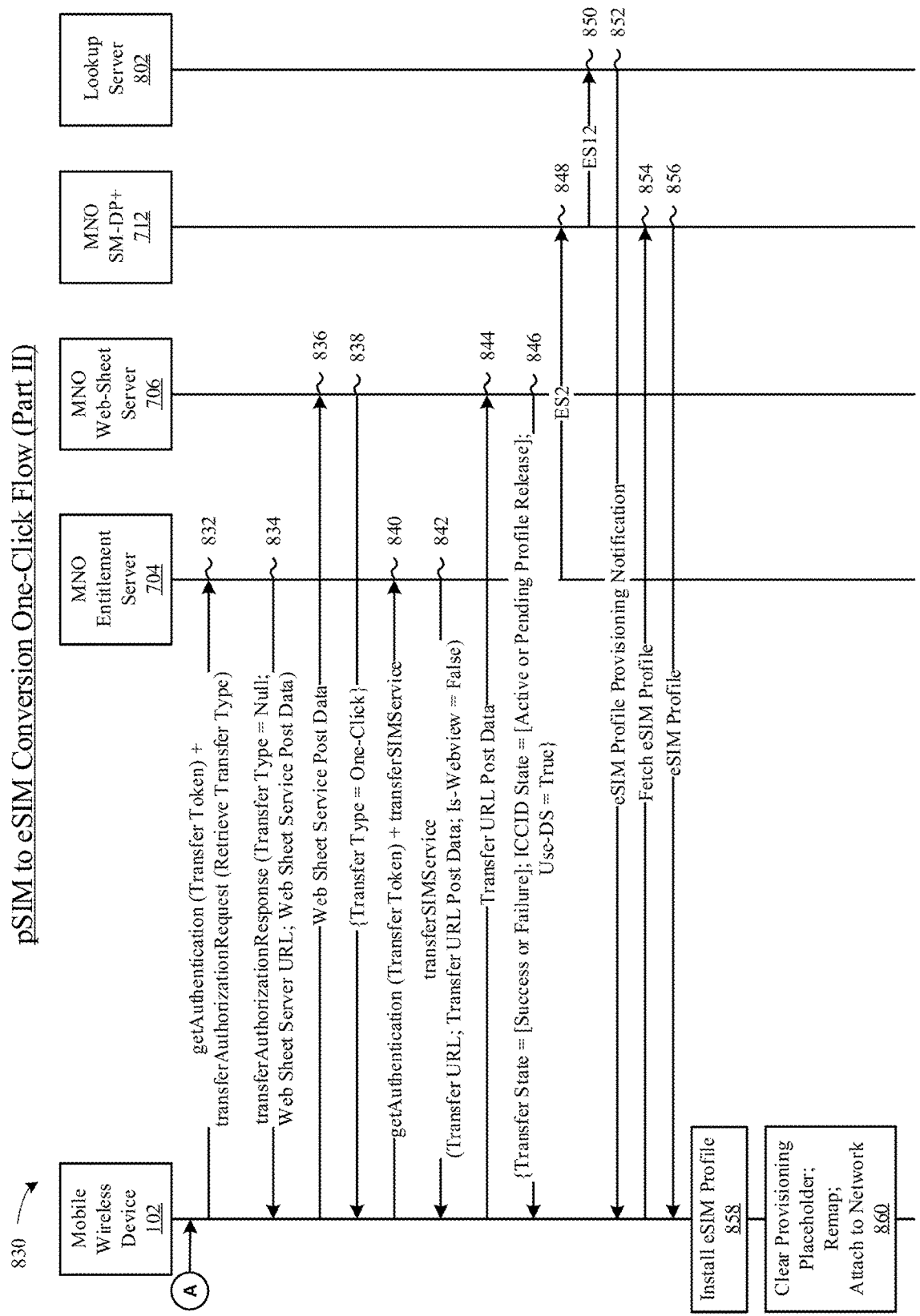
Figure 8C:
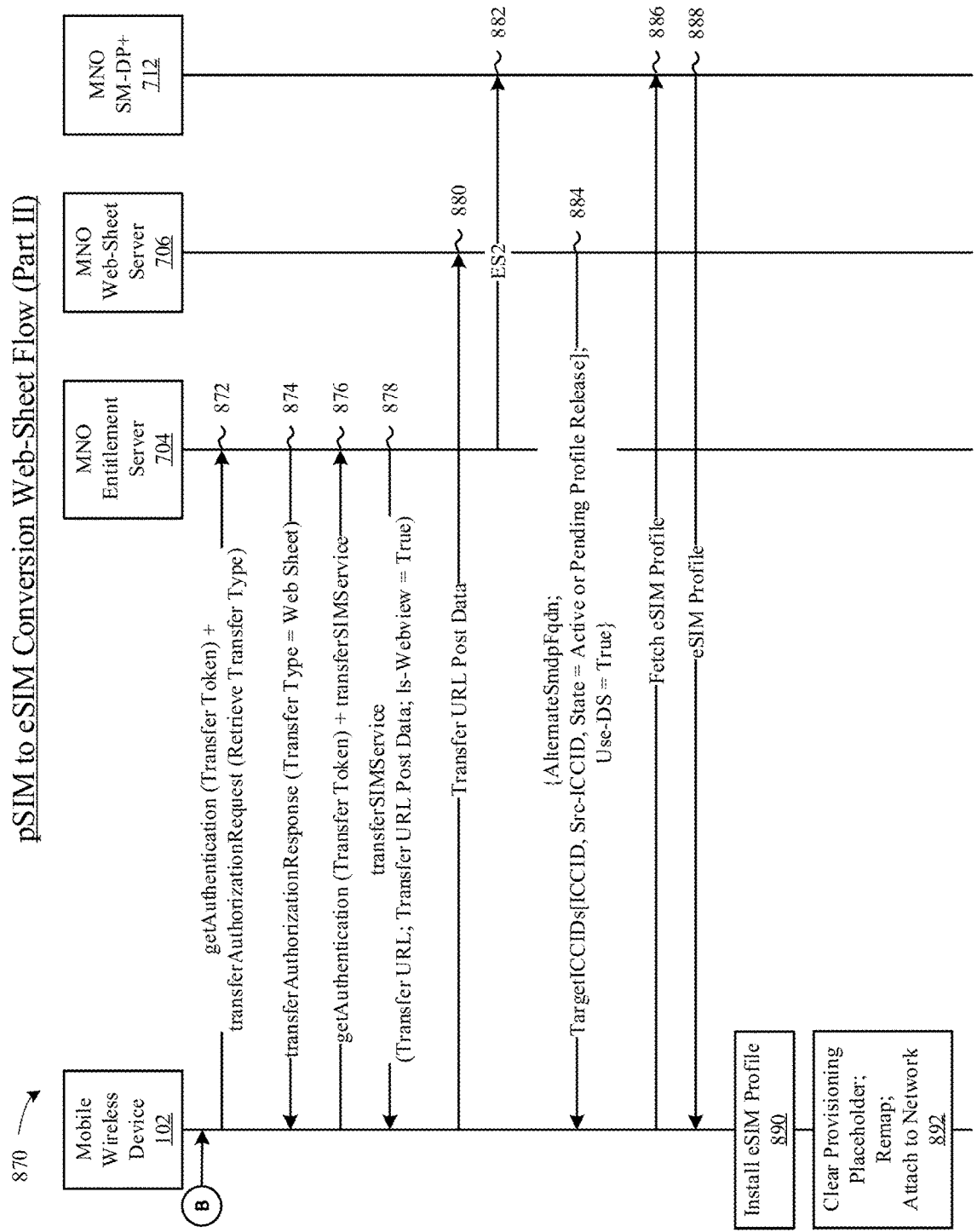

FIGS. 8A, 8B, and 8C illustrate flowcharts 800, 830, and 870 of two exemplary pSIM to eSIM 208 conversion call flows for two different scenarios, a one-click scenario and an MNO web-sheet server scenario. FIGS. 8A and 8B illustrate a one-click pSIM to eSIM 208 conversion call flow, while FIGS. 8A and 8C illustrate a pSIM to eSIM 208 conversion call flow that includes direct interaction with an MNO web-sheet server 706. In either scenario, the actions illustrated in FIG. 8A are undertaken by the mobile wireless device 102 to realize the pSIM to eSIM 208 conversion. At 804, the mobile wireless device 102 sends a message, e.g., a getEntitlement message, to an MNO entitlement server 704 to determine whether transfer of a cellular services plan profile, e.g., authorized by credentials of a pSIM, can be transferred, e.g., to an eSIM 208 to be installed on an eUICC 108 of the mobile wireless device 102. At 806, the MNO entitlement server 704 responds with an indication of a status of the cellular service plan profile and a name (label) for the transfer. At 808, the mobile wireless device 102 initiates conversion of the pSIM to an eSIM 208. At 810, the mobile wireless device 102 creates a pending transfer plan item indicating that a transfer of the pSIM has initiated but not yet completed. At 812, the mobile wireless device 102 initiates the transfer by requesting one or more tokens from the MNO entitlement server 704. At 814, the mobile wireless device 102 initiates an authentication key agreement (AKA) procedure with the MNO entitlement server, e.g., by sending a getAuthentication (EAP-AKA) message along with a message (or a combined message) to obtain a nonce response for authorization. At 816, the MNO entitlement server 704 responds with the nonce, e.g., by sending a getCarrierAuthorizationNonce message that includes the nonce therein. At 818, the mobile wireless device 102 continues authentication and authorization requests by sending a second getAuthentication (EAP-AKA) message and an authenticateTrustFlag message that returns the nonce, signed by the mobile wireless device 102, to the MNO entitlement server 704. If authentication and authorization succeed, the MNO entitlement server 704, at 820, returns an authorization token to the mobile wireless device 102, e.g., in a second authenticateTrustFlag message. At 822, the mobile wireless device 102 continues by sending a third getAuthentication (EAP-AKA) message with a request for transfer authorization, e.g., by sending a transferAuthorizationRequest message to the MNO entitlement server 704, the request including the authorization token and an indication of a request for a transfer token ("Retrieve Token" content in the request message). At 824, the MNO entitlement server 704 sends a transfer token to the mobile wireless device 102 in a response message, e.g., a transferAuthorizationResponse message. At 826, the mobile wireless device 102 has obtained successfully from the MNO entitlement server 704 a response with a transfer token for transfer of the credentials of the pSIM to an eSIM 208 (yet to be installed in the eUICC 108 of the mobile wireless device 102).

The mobile wireless device 102 continues, in FIG. 8B, in a one-click call flow, at 832, by sending the transfer token to the MNO entitlement server with a request for an indication of a type of transfer to occur, e.g., by sending a getAuthentication message that includes the transfer token and a transferAuthorizationRequest message seeking to retrieve the transfer type. At 834, the MNO entitlement server 704 provides a transfer authorization response message that redirects the mobile wireless device 102 to an MNO web-sheet server 706 to determine the transfer type, e.g., by sending a transferAuthorizationResponse message that includes a null (or a particular transfer type value indicating an unknown transfer type), a universal resource locator (URL) or other identifier for the MNO web-sheet server 706, and web-sheet service post data for the mobile wireless device 102 to use for communication with the MNO web-sheet server 706. At 836, the mobile wireless device 102 sends the web-sheet service post data to the MNO web-sheet server 706 and receives in response, at 838, an indication of a one-click transfer type for the transfer of the pSIM to an eSIM 208. At 840, the mobile wireless device 102 sends to the MNO entitlement server 704 a message to initiate transfer, the message including the transfer token and an indication for transfer, e.g., transferSIMService. At 842, the MNO entitlement server 704 responds with a message, e.g., transferSIMService message, that provides a second URL, e.g., Transfer URL, with a second set of post data, e.g., Transfer URL post data, and an indication that direct interaction by a user with the MNO web-sheet server 706 to authorize the transfer is not required, e.g., IS-Webview=False indication. At 844, the mobile wireless device 102 sends the transfer URL post data to the MNO web-sheet server 706. At 846, the MNO web-sheet server 706 responds with an indication of whether a transfer state for the pSIM to eSIM transfer has succeeded (Success) or failed (Failure), and a state for the new eSIM 208, identified by an ICCID value, where the ICCID state is either active or pending release. The response further includes a Use-DS=True indication. The MNO entitlement server 704, at 848, sends a message via an ES2 interface to an MNO provisioning server, e.g., MNO SM-DP+ 712, to ready the eSIM 208 for the mobile wireless device 102 to download and install. The MNO SM-DP+ 712 server, at 850, provides an indication, via an ES12 interface, to a notification server, e.g., lookup server 802, when the eSIM 208 is ready for download by the mobile wireless device 102. At 852, the lookup server 802 sends a notification to the mobile wireless device 102 indicating that a pending eSIM 208 profile is available for download to the mobile wireless device 102. At 854, the mobile wireless device sends a message to the MNO SM-DP+ 712 server to retrieve the pending eSIM 208 profile. At 856, the MNO SM-DP+ 712 server downloads the eSIM 208 profile to the mobile wireless device 102. At 858, the mobile wireless device 102 installs the downloaded eSIM 208 profile on the eUICC 108 of the mobile wireless device 102. At 860, the mobile wireless device 102 clears the pending eSIM 208 profile placeholder created earlier at 810, remaps locally in the mobile wireless device 102 cellular service pointers for the previous pSIM profile to the newly installed eSIM 208 profile. In some embodiments, the mobile wireless device 102 enters a monitoring mode after installing the eSIM 208 profile and waits for a message from a network-based server of the MNO 114 before disabling the previous pSIM profile (e.g., before performing the remapping). In some embodiments, the message indicates that back-end provisioning and/or activation of the eSIM 208 profile for the mobile wireless device 102 is complete. In some embodiments, the network-based server of the MNO 114 includes one of: the MNO entitlement server 704, the MNO web-sheet server, the MNO SM-DP+ (or other MNO provisioning server 116), or the lookup server 802. Further at 860, the mobile wireless device 102 attaches to the cellular wireless network of the MNO 114 associated with the downloaded eSIM 208 profile using the credentials of the downloaded eSIM 208 profile for authentication with the cellular wireless network of the MNO 114.

Alternatively, the mobile wireless device 102 continues, in FIG. 8C, in a web-sheet call flow, at 872, by sending the transfer token to the MNO entitlement server with a request for an indication of a type of transfer to occur, e.g., by sending a getAuthentication message that includes the transfer token and a transferAuthorizationRequest message seeking to retrieve the transfer type. At 874, the MNO entitlement server 704 provides a transfer authorization response message that indicates the mobile wireless device 102 must proceed with direct interaction with an MNO web-sheet server 706, e.g., by sending a transferAuthorizationReqponse message that includes a web-sheet transfer type. At 876, the mobile wireless device 102 sends to the MNO entitlement server 704 a message to initiate transfer, the message including the transfer token and an indication for transfer, e.g., transferSIMService. At 878, the MNO entitlement server 704 responds with a message, e.g., transferSIMService message, that provides a URL, e.g., Transfer URL, with a set of post data, e.g., Transfer URL post data, and an indication that direct interaction by a user with the MNO web-sheet server 706 to authorize the transfer is required, e.g., IS-Webview=True indication. At 880, the mobile wireless device 102 sends the transfer URL post data to the MNO web-sheet server 706. At 882, the MNO entitlement server 704 sends a message via an ES2 interface to an MNO provisioning server, e.g., MNO SM-DP+ 712, to ready the eSIM 208 for the mobile wireless device 102 to download and install. At 884, the MNO web-sheet server 706 responds to the mobile wireless device 102 with an alternate fully qualified domain name (FQDN) for the MNO SM-DP+ 712 server, a unique identifier value for the new (to be downloaded/installed) eSIM 208, an ICCID value, a corresponding ICCID value for the pSIM, and state indication of whether the eSIM 208 is ready (active) for download or pending profile release. The response further includes a Use-DS=True indication. At 886, the mobile wireless device sends a message to the MNO SM-DP+ 712 server to retrieve the pending eSIM 208 profile. At 888, the MNO SM-DP+ 712 server downloads the eSIM 208 profile to the mobile wireless device 102. At 890, the mobile wireless device 102 installs the downloaded eSIM 208 profile on the eUICC 108 of the mobile wireless device 102. At 892, the mobile wireless device clears the pending eSIM 208 profile placeholder created earlier at 810, remaps locally in the mobile wireless device 102 cellular service pointers for the previous pSIM profile to the newly installed eSIM 208 profile. In some embodiments, the mobile wireless device 102 enters a monitoring mode after installing the eSIM 208 profile and waits for a message from a network-based server of the MNO 114 before disabling the previous pSIM profile (e.g., before performing the remapping). In some embodiments, the message indicates that back-end provisioning and/or activation of the eSIM 208 profile for the mobile wireless device 102 is complete. In some embodiments, the network-based server of the MNO 114 includes one of: the MNO entitlement server 704, the MNO web-sheet server, the MNO SM-DP+ (or other MNO provisioning server 116), or the lookup server 802.

Additionally, at 892, the mobile wireless device 102 attaches to the cellular wireless network of the MNO 114 associated with the downloaded eSIM 208 profile using the credentials of the downloaded eSIM 208 profile for authentication with the cellular wireless network of the MNO 114.

Figure 9A:
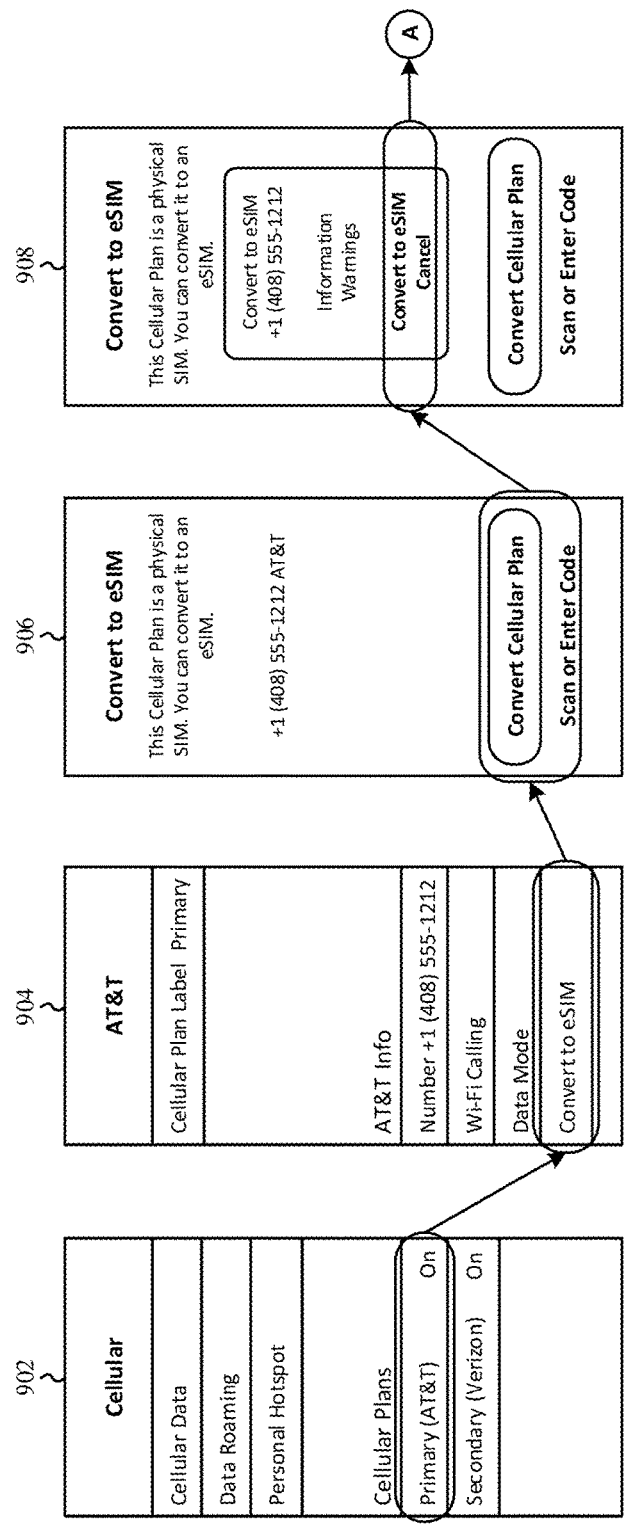
FIGS. 9A and 9B illustrate diagrams of an exemplary series of user interface screens to display during conversion of a pSIM to an eSIM in a mobile wireless device, according to some embodiments.
Figure 9B:
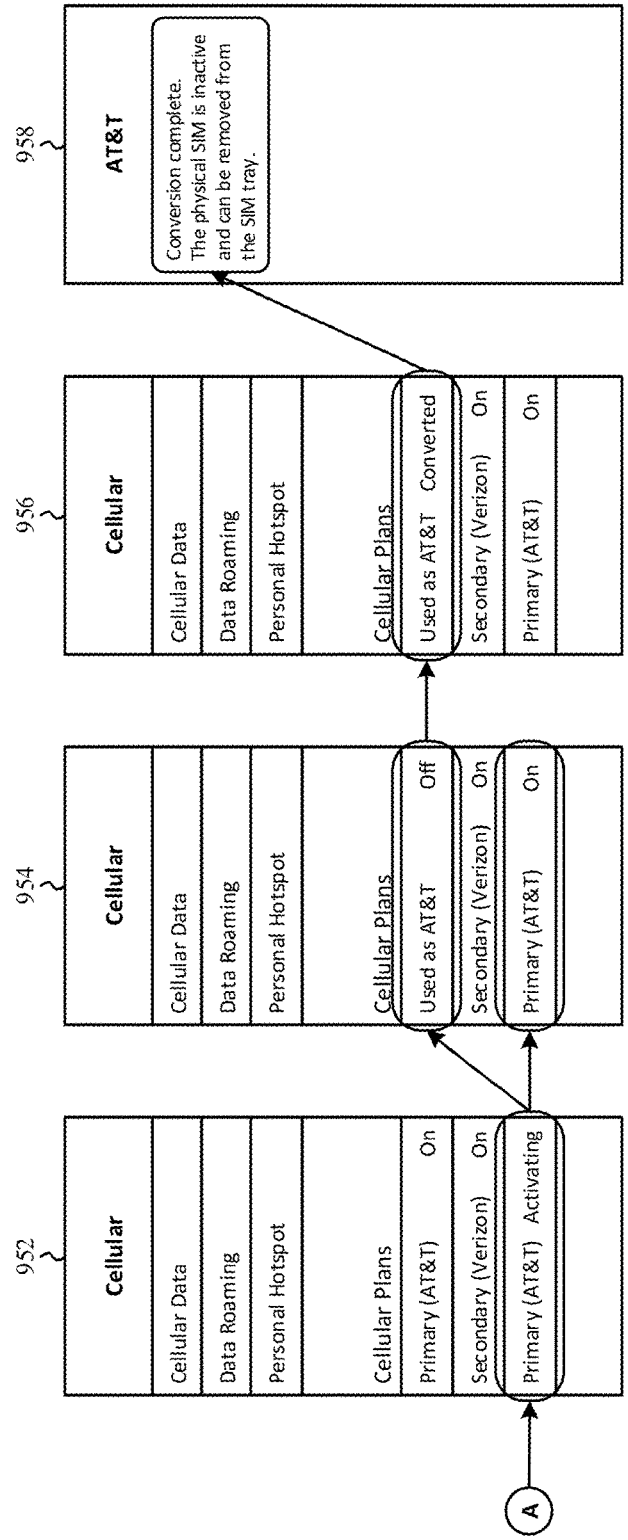

FIGS. 9A and 9B illustrate diagrams 900, 950 of an exemplary series of user interface screens that can be displayed on the mobile wireless device 102 to a user during a conversion of a pSIM on a UICC 118 of the mobile wireless device 102 to an eSIM 208 on the eUICC 108 of the mobile wireless device 102. At 902, a set of cellular wireless service plan profiles available on the mobile wireless device 102 can be displayed, including an indication of the associated MNO 114 and status (e.g., "on" or "off" for enabled or disabled respectively). For a particular cellular wireless service plan profile, at 904, an option for conversion of the cellular service plan, which can be included in a UICC 118 of the mobile wireless device 102, to an eSIM 208 for installation on the eUICC 018 of the mobile wireless device 102, can be presented. Selection of the conversion option proceeds to presentation, at 906, of a confirmation selection button, which can also include a requirement for entering a confirmation code or scanning a QR code. When conversion is selected to proceed, at 908, additional information warning messages can be presented as an overlay, and requesting the user to confirm conversion of the pSIM to an eSIM 208 or to cancel the conversion. When confirmation of conversion occurs, subsequently at 952, an indication of conversion of the pSIM to an eSIM 208 can be provided, e.g., by indicating that activation of the new eSIM 208 is in process while various actions are taken by the mobile wireless device 102 in communication with cellular wireless network entities as described previously. Once conversion of the eSIM 208 has occurred, at 954, the previously used pSIM cellular profile can be indicated as "off" (disabled), while the newly installed eSIM 208 can be indicated as "on" (active). Further, at 956, the previously used pSIM cellular profile can be marked as "converted". Selection at 956 by the user of the previously used and presently converted pSIM cellular profile can cause the mobile wireless device 102 to display, at 958, an overlay message indicating that the pSIM is inactive and the UICC 118 can be removed from the mobile wireless device 102.

FIG. 10 illustrates a table 1000 of a set of preferences (user defined settings) for a cellular service profile, e.g., a pSIM profile, that can be transferred as part of (or subsequent to) the conversion to an eSIM 208 on the eUICC 108 of the mobile wireless device 102. Automatic transfer of user-defined preferences may not necessarily occur when installing a new pSIM or downloading a new eSIM 208 separate from conversion of an existing pSIM, as a relationship between an existing pSIM and the new pSIM or eSIM may be unknown outside of a conversion process initiated by a user of the mobile wireless device 102. The pSIM to eSIM 208 conversion procedure advantageously allows for multiple user-defined preferences to be migrated from the pSIM to the eSIM 208, in some cases automatically, where such migration would not occur when replacing the pSIM with a different pSIM. User-defined preferences that can migrate from the pSIM to the eSIM 208 can include: an indication as to whether the profile is used as a default data line; an indication as to whether the profile is used as a default voice line, whether roaming is enabled, whether a messaging application, iMessage®, is associated with the profile, whether a video chat application, e.g., FaceTime®, is associated with the profile, whether a particular radio access technology (RAT) preference is selected when using the profile, and/or whether data is enabled, whether caller identification (ID) for outgoing calls is enabled. Some preferences settings may depend on the MNO 114 with which the newly installed eSIM 208 is associated, e.g., Wi-Fi calling enabled or disabled, and may not automatically transfer in some instances.

Figure 11A:
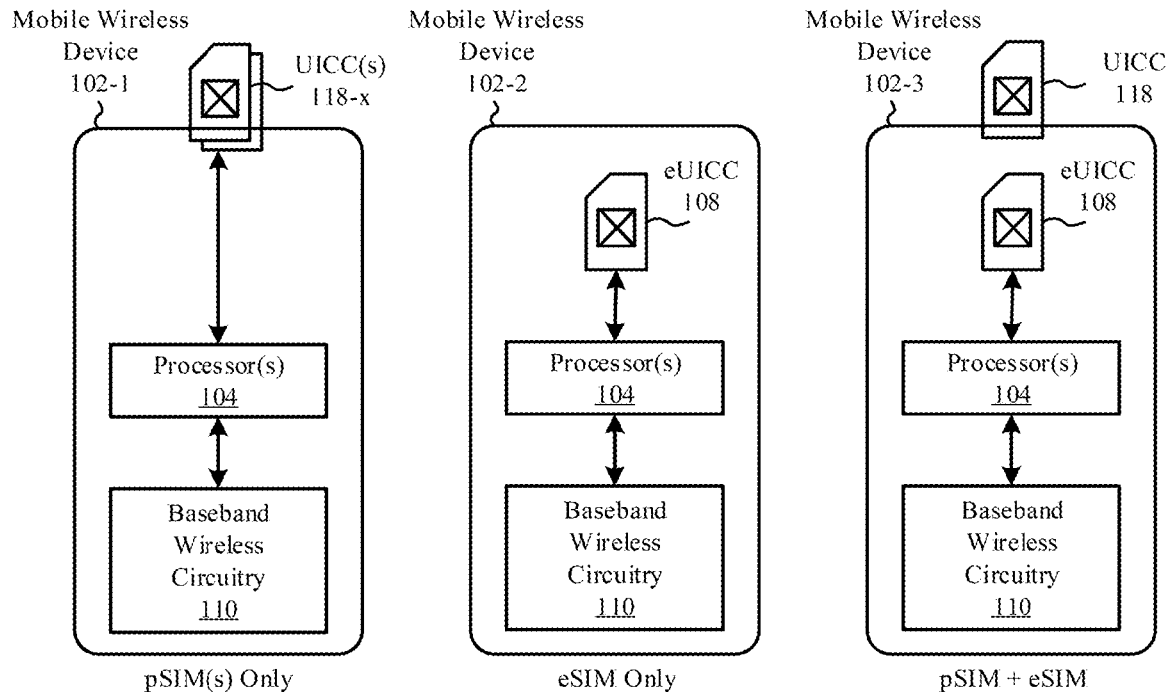
FIG. 11A illustrates diagrams of different configurations of pSIM and eSIM capability in mobile wireless devices, according to some embodiments.
Figure 11A:
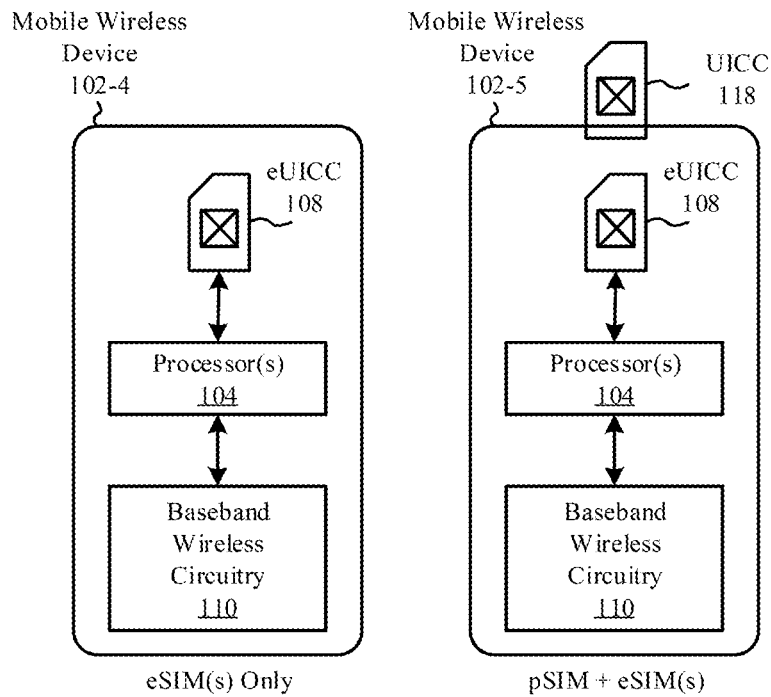

FIG. 11A illustrates diagrams 1100, 1120 of different configurations for mobile wireless devices 102 that include different combinations of UICCs 118 and/or an eUICC 108. In a first set of configurations, the mobile wireless devices 102 include at most one enabled eSIM 208 (which may be a software, firmware, and/or hardware limitation) and a variable number of UICCs 118. In a second set of configurations, the mobile wireless devices 102 allow for multiple enabled eSIMs 208 on the same mobile wireless device 102. In a first configuration, mobile wireless device 102-1 includes one or more UICCs 118 and does not include an eUICC 108 (and therefore no eSIMs 208). In a second configuration mobile wireless device 102-2, mobile wireless device 102-2 includes an eUICC 108 (on which at most one eSIM 208 can be enabled at a time) and does not include any UICCs 118. In a third configuration, mobile wireless device 102-3 includes both a UICC 118 (or more than one, which is not shown) and an eUICC 108 (on which at most one eSIM 208 can be enabled at a time). In a fourth configuration, mobile wireless device 102-4 includes an eUICC 108 on which multiple eSIMs 208 can be simultaneously enabled. In a fifth configuration, mobile wireless device 102-5 includes a UICC 118 (or more than one, which is not shown) and an eUICC 108 on which multiple eSIMs 208 can be simultaneously enabled. Different configurations of mobile wireless devices 102 can be used to provide a dual-SIM, dual-standby (DSDS) capability using a combination of active pSIMs and eSIMs 208. For example, mobile wireless device 102-1 of the first configuration can include two active pSIMs on two UICCs 118-x. Mobile wireless device 102-3 of the third configuration (and mobile wireless device 102-5 of the fifth configuration) can include one active pSIM on a UICC 118 and one active eSIM 208 on the eUICC 08. Mobile wireless device 102-4 can include multiple active eSIMs 208 on the eUICC 108. When converting a pSIM to an eSIM 208 in a mobile wireless device 102, the configurations that the mobile wireless device 102 can affect whether DSDS capability can be maintained after conversion. When only one active eSIM 208 is allowed on an eUICC 108 at one time, DSDS capability can be lost after conversion of a pSIM to an eSIM 208.

Figure 11B:
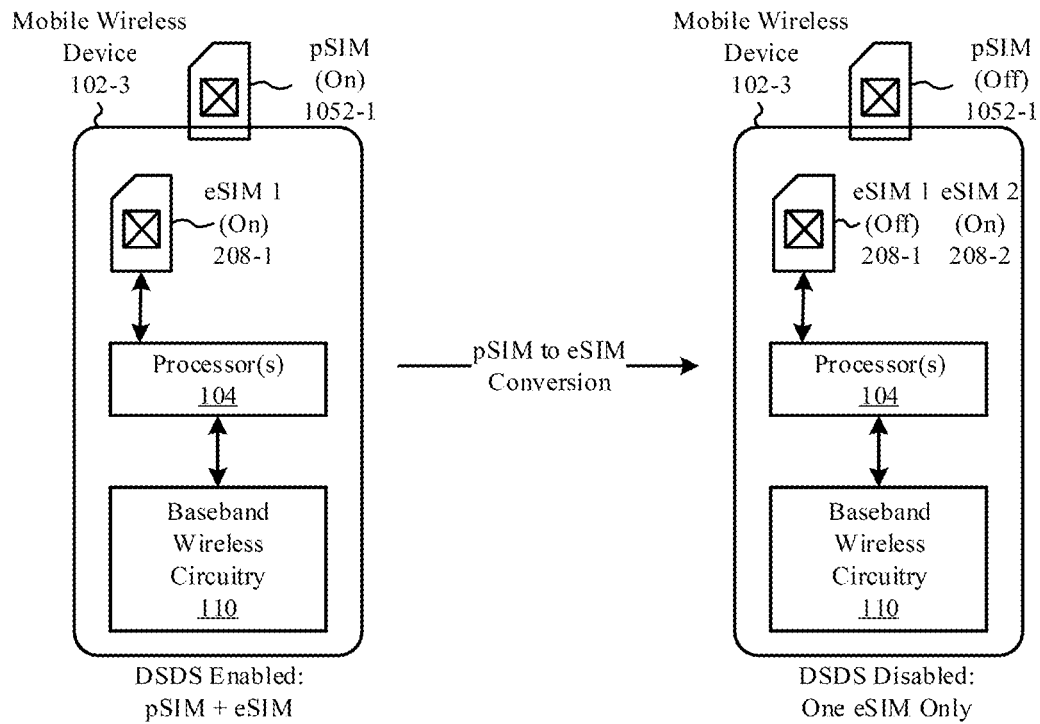
FIG. 11B illustrates diagrams of exemplary pSIM to eSIM conversion that affect dual-SIM dual-standby (DSDS) capabilities for a mobile wireless device, according to some embodiments.
Figure 11B:
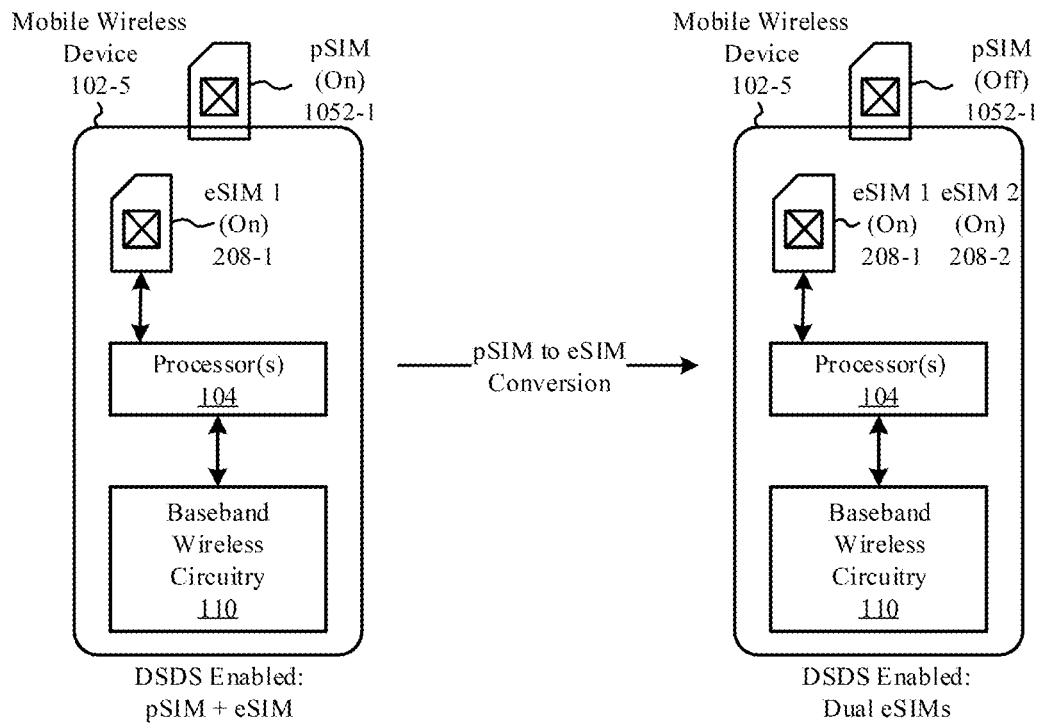

FIG. 11B illustrates a diagram 1140 of an example configuration in which a pSIM to eSIM conversion causes a DSDS capability to be lost and a diagram 1160 of an example configuration in which DSDS capability is maintained after pSIM to eSIM conversion. Availability of DSDS capability after conversion can depend on whether the mobile wireless device 102 supports multiple, simultaneously enabled eSIM 208 profiles. In the example configuration for mobile wireless device 102-3, on which only one eSIM 208 profile can be enabled at a time, after conversion of the pSIM 1052-1 to an active eSIM 208-2 on the eUICC 108, a previously active eSIM 208-1 is turned off. The previously used pSIM 1052-1 is also made inactive as part of the conversion process. As a result, only the newly installed eSIM 208-2 is active after conversion. The DSDS capability previously enabled by a combination of pSIM 1052-1 and eSIM 208-1 for mobile wireless device 102-3 is disabled after the conversion. In some cases, a user of the mobile wireless device 102-3 can be alerted to this change before the pSIM to eSIM conversion o allow for cancelling the conversion process. In the example configuration for mobile wireless device 102-5, on which multiple eSIM 208 profiles can be enabled at a time, after conversion of the pSIM 1052-1 to an active eSIM 208-2 on the eUICC 108, a previously active eSIM 208-1 can remain active, while the previously used pSIM 1052-1 is made inactive. DSDS capability that previously used a combination of pSIM 1052-1 and eSIM1 208-1 can continue to be available after conversion using a combination of eSIM1 208-1 and eSIM2 208-2. With multiple enabled eSIM 208 profile capability, a mobile wireless device 102 can maintain DSDS capability after conversion.

Figure 12:
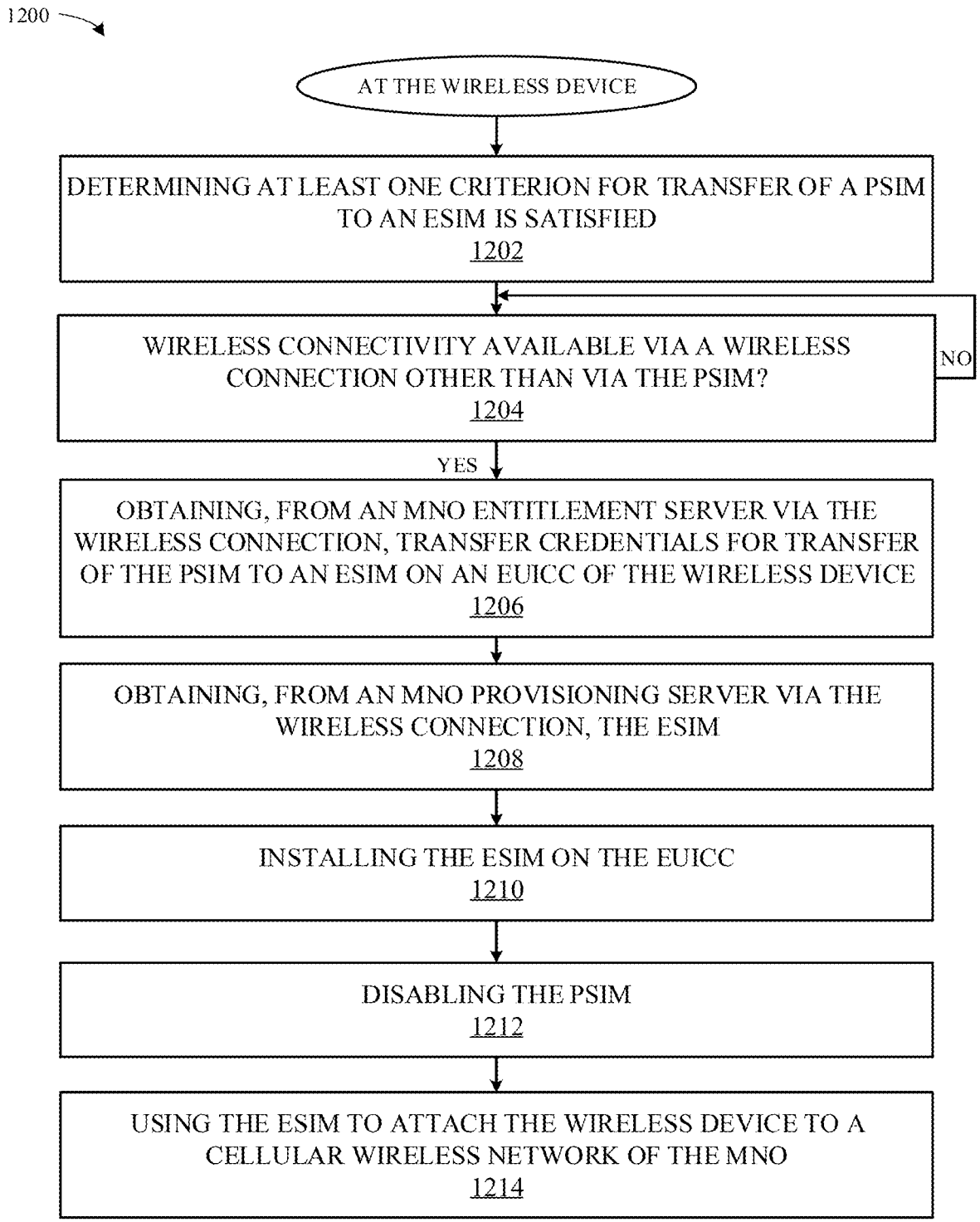
FIG. 12 illustrates a flowchart of an exemplary method for pSIM to eSIM conversion performed by a mobile wireless device, according to some embodiments.

FIG. 12 illustrates a flowchart 1200 of an exemplary method for pSIM to eSIM 208 conversion performed by a wireless device 102. At 1202, the wireless device 102 determines at least one criterion for transfer of a pSIM to an eSIM 208 on the wireless device 102 is satisfied. At 1204, the wireless device 102 determines whether wireless connectivity is available to the wireless device using an alternate wireless connection other than effected via the pSIM to be converted. When the alternate wireless connection is available, at 1206, the wireless device 102 obtains, from an MNO entitlement server 704, transfer credentials for transfer of the pSIM to an eSIM 208 to be installed on an eUICC 108 of the wireless device 102. At 1208, the wireless device 102 obtains, from an MNO provisioning server 116, e.g., SM-DP+ 712 server, via the alternate wireless connection, the eSIM 208. At 1210, the wireless device 102 installs the eSIM 208 on the eUICC 108 of the wireless device 102. At 1212, the wireless device 102 disables the pSIM. At 1214, the wireless device 102 uses the eSIM 208 to attach to a cellular wireless network of an MNO 114 associated with the eSIM 208.

In some embodiments, the method further includes the wireless device 102 transferring one or more user-defined settings from the pSIM to the eSIM 208 after installation of the eSIM 208 on the eUICC 108 of the wireless device 102. In some embodiments, the method further includes the wireless device 102 marking the pSIM as converted, and displaying a notification indicating permissibility to remove the pSIM from the wireless device 102. In some embodiments, the method further includes the wireless device enabling the eSIM 208 after disabling the pSIM, when the wireless device 102 supports multiple simultaneously enabled eSIMs 208, and enabling the eSIM 208 before disabling the pSIM, when the wireless device 102 supports at most one enabled eSIM 208 at a time. In some embodiments, the eSIM 208 provides access to one or more 5G capabilities unavailable to the wireless device 102 via the pSIM. In some embodiments, the one or more 5G capabilities include an identity privacy protection feature. In some embodiments, the identity privacy protection feature includes use of an encrypted SUCI 326 in place of an unencrypted SUPI 304 for one or more messages communicated with the cellular wireless network of the MNO. In some embodiments, the wireless connection includes a wireless local area network (WLAN) connection. In some embodiments, the at least one criterion includes the wireless device 102 supports 5G cellular wireless service. In some embodiments, the at least one criterion includes detection of one or more cells of a 5G network associated with the MNO. In some embodiments, the at least one criterion includes determination that the pSIM lacks support for a 5G identity privacy protection feature. In some embodiments, the method further includes the wireless device 102 entering a monitoring mode after installing the eSIM 208 on the eUICC 108, and the wireless device monitoring for receipt of a message from an MNO 114 network-based server before disabling the pSIM, where the message indicates activation of the eSIM 208 within the cellular wireless network of the MNO is complete. In some embodiments, the MNO 114 network-based server includes the MNO entitlement server 704. In some embodiments, the MNO 114 network-based server includes the MNO provisioning server 116, e.g., SM-DP+ 712 server. In some embodiments, the pSIM includes credentials includes access to a home cellular wireless network, and the at least one criterion for transfer conversion of the pSIM to the eSIM 208 on the eUICC 108 includes receipt of a valid request from a user of the wireless device 102 to perform the transfer conversion. In some embodiments, the method further includes replacing the pSIM of the wireless device 102 with a second pSIM after disabling the pSIM, where the second pSIM includes credentials for access to a visited cellular wireless network. In some embodiments, the at least one criterion for transfer conversion of the pSIM to the eSIM 208 on the eUICC 108 includes a change of the MNO 114 associated with the pSIM. In some embodiments, the method further includes, when the at least one criterion is satisfied and wireless connectivity is available to the wireless device 102 via a wireless connection other than via the pSIM: i) displaying a notification indicating an option to perform transfer conversion of the pSIM to the eSIM 208, and ii) obtaining acceptance of the option before obtaining, from the MNO entitlement server 704 via the wireless connection, transfer credentials for transfer of the pSIM to the eSIM 208. In some embodiments, the notification further indicates the option to perform the transfer conversion of the pSIM to the eSIM 208 allows for access to fifth generation (5G) services previously unavailable via the pSIM on the wireless device 102. In some embodiments, the acceptance of the option includes approval of revised terms and conditions for cellular wireless service for use of the eSIM 208.

Representative Exemplary Apparatus

Figure 13:
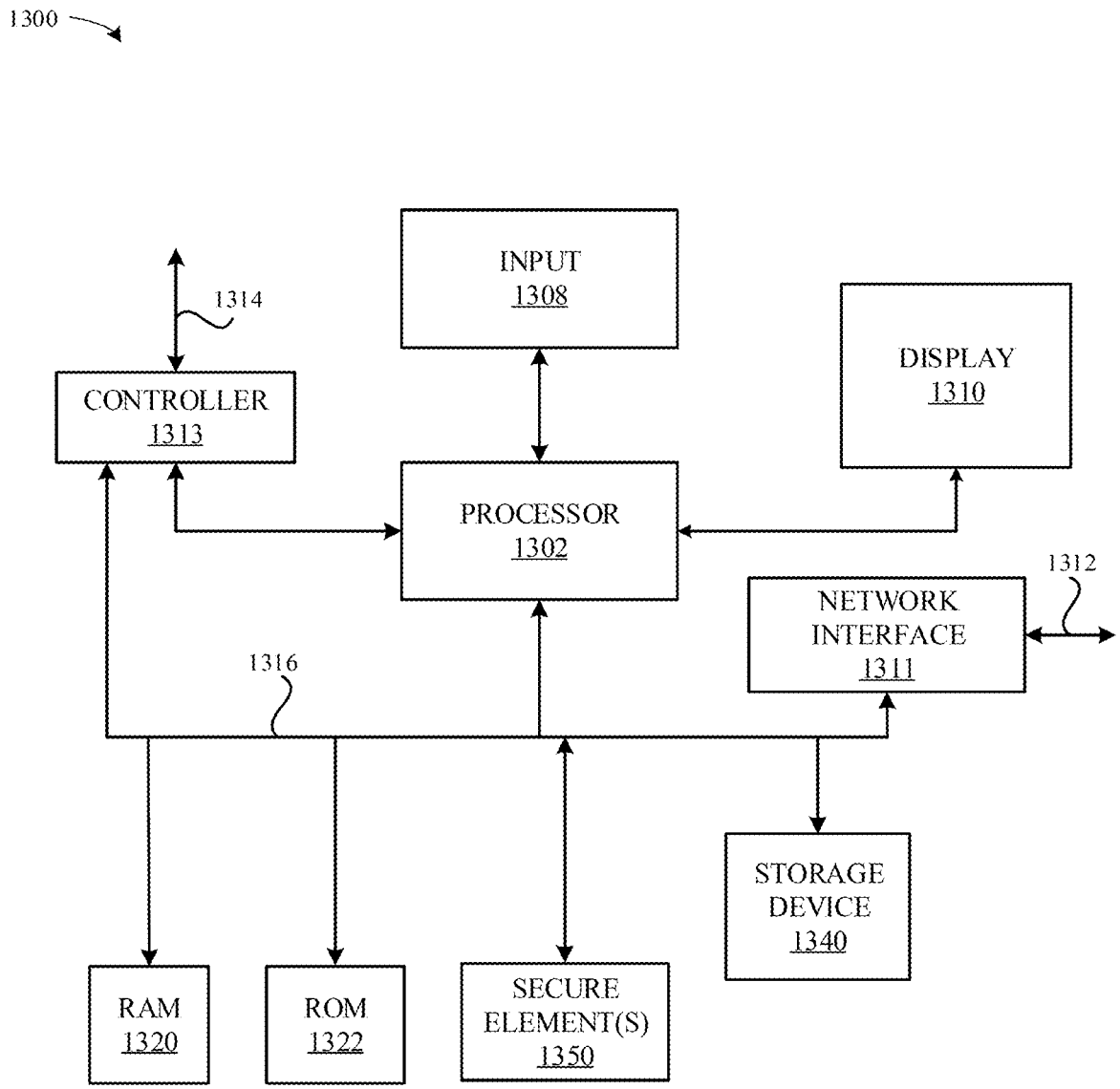
FIG. 13 illustrates a block diagram of exemplary elements of a mobile wireless device, according to some embodiments.

FIG. 13 illustrates in block diagram format an exemplary computing device 1300 that can be used to implement the various components and techniques described herein, according to some embodiments. In particular, the detailed view of the exemplary computing device 1300 illustrates various components that can be included in the mobile wireless device 102. As shown in FIG. 13, the computing device 1300 can include one or more processors 1302 that represent one or more microprocessors or controllers for controlling the overall operation of computing device 1300. The one or more processors 1302 of computing device 1300 can correspond to the one or more processors 104 for the mobile wireless device 102. In some embodiments, the computing device 1300 can also include a user input device 1308 that allows a user of the computing device 1300 to interact with the computing device 1300. For example, in some embodiments, the user input device 1308 can take a variety of forms, such as a button, keypad, dial, touch screen, audio input interface, visual/image capture input interface, input in the form of sensor data, etc. In some embodiments, the computing device 1300 can include a display 1310 (screen display) that can be controlled by the one or more processors 1302 to display information to the user (for example, information relating to an ongoing process, such as during initial setup or restoration of the computing device 1300). A data bus 1316 can facilitate data transfer between at least a storage device 1340, the one or more processors 1302, and a controller 1313. The controller 1313 can be used to interface with and control different equipment through an equipment control bus 1314. The computing device 1300 can also include a network/bus interface 1311 that couples to a data link 1312. In the case of a wireless connection, the network/bus interface 1311 can include wireless circuitry 110, such as a wireless transceiver and/or a baseband processor, that can be used to communicate with one or more cellular wireless networks 130 and/or with non-cellular wireless networks. The computing device 1300 can also include one or more secure elements 1350. The secure elements 1350 can include an eUICC 108 that can store one or more eSIMs 208 and a UICC 118 that can store a SIM.

The computing device 1300 also includes a storage device 1340, which can include a single storage or a plurality of storages (e.g., hard drives, memory modules), and includes a storage management module that manages one or more partitions within the storage device 1340. In some embodiments, storage device 1340 can include flash memory, semiconductor (solid state) memory or the like. The computing device 1300 can also include a Random-Access Memory (RAM) 1320 and a Read-Only Memory (ROM) 1322. The ROM 1322 can store programs, utilities or processes to be executed in a non-volatile manner. The RAM 1320 can provide volatile data storage, and stores instructions related to the operation of the computing device 1300.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless device configured for cellular service plan transfer, the wireless device comprising:
    wireless circuitry comprising one or more antennas;
    an embedded universal integrated circuit card (eUICC) configured to store at least one electronic subscriber identity module (eSIM);
    at least one processor communicatively coupled to a memory, to the eUICC, and to the wireless circuitry, the memory storing instructions to configure the wireless device to:
        detect presence of a universal integrated circuit card (UICC) storing a physical SIM (pSIM) in the wireless device, wherein the pSIM includes credentials for access to cellular service of a mobile network operator (MNO) in accordance with a cellular service plan;
        determine at least one criterion is satisfied for transfer of the cellular service plan from the pSIM stored in the UICC to an eSIM to be installed on the eUICC of the wireless device, wherein the eSIM includes corresponding credentials for access to the cellular service of the MNO in accordance with the cellular service plan;

while wireless connectivity is available to the wireless device via a wireless connection other than via the pSIM:

obtain, from an entitlement server of the MNO via the wireless connection, transfer credentials authorizing transfer of the cellular service plan from the pSIM stored in the UICC to the eSIM to be installed on the eUICC; and obtain, from a provisioning server of the MNO via the wireless connection, the eSIM;

install the eSIM on the eUICC;

disable the pSIM on the UICC; and use the eSIM to attach the wireless device to a cellular wireless network of the MNO.

2. The wireless device of claim 1, wherein the wireless device is further configured to:

transfer one or more user-defined settings from the pSIM stored in the UICC to the eSIM after installation of the eSIM on the eUICC of the wireless device.

3. The wireless device of claim 1, wherein the wireless device is further configured to:

mark the pSIM as converted; and display a notification indicating permissibility to remove the UICC storing the pSIM from the wireless device.

4. The wireless device of claim 1, wherein the wireless device is further configured to:

when the wireless device supports multiple simultaneously enabled eSIMs, enable the eSIM after disabling the pSIM; and when the wireless device supports at most one enabled eSIM at a time, enable the eSIM before disabling the pSIM.

5. The wireless device of claim 1, wherein the eSIM provides access to one or more fifth generation (5G) capabilities unavailable to the wireless device via the pSIM.

6. The wireless device of claim 5, wherein the one or more 5G capabilities include an identity privacy protection feature comprising use of an encrypted subscription concealed identifier (SUCI) in place of an unencrypted subscriber permanent identifier (SUPI) for one or more messages communicated with the cellular wireless network of the MNO.

7. The wireless device of claim 1, wherein the wireless connection comprises a wireless local area network (WLAN) connection.

8. The wireless device of claim 1, wherein the at least one criterion comprises the wireless device supports 5G cellular wireless service.

9. The wireless device of claim 1, wherein the at least one criterion comprises detection of one or more cells of a 5G network associated with the MNO.

10. The wireless device of claim 1, wherein the at least one criterion comprises determination that the pSIM lacks support for a 5G identity privacy protection feature.

11. The wireless device of claim 1, wherein the wireless device is further configured to:

enter a monitoring mode after installing the eSIM on the eUICC; and monitor for receipt of a message from a network-based server of the MNO before disabling the pSIM, the message indicating activation of the eSIM within the cellular wireless network of the MNO is complete.

12. The wireless device of claim 11, wherein the network-based server of the MNO comprises the MNO entitlement server of the MNO or the provisioning server of the MNO.

13. The wireless device of claim 1, wherein:

the pSIM includes credentials for access to a home cellular wireless network of the MNO; and the at least one criterion comprises receipt of a valid request from a user of the wireless device to perform transfer conversion of the cellular service from the pSIM stored in the UICC to the eSIM to be installed on the eUICC.

14. The wireless device of claim 13, wherein the wireless device is further configured to:

accept replacement of the UICC storing the pSIM in of the wireless device with a second UICC storing a second pSIM in the wireless device after disabling the pSIM, wherein the second pSIM includes credentials for access to a visited cellular wireless network.

15. The wireless device of claim 1, wherein the at least one criterion comprises a change of the MNO associated with the pSIM.

16. The wireless device of claim 1, wherein the wireless device is further configured to:

display a notification indicating an option to perform transfer conversion of the pSIM to the eSIM; and obtain acceptance of the option before obtaining, from the entitlement server of the MNO via the wireless connection, the transfer credentials for transfer of the cellular service plan from the pSIM stored in the UICC to the eSIM to be installed on the eUICC.

17. The wireless device of claim 16, wherein:

the notification further indicates the option to perform the transfer conversion of the cellular service plan from pSIM stored in the UICC to the eSIM to be installed on the eUICC allows for access to fifth generation (5G) services previously unavailable via the pSIM on the wireless device.

18. The wireless device of claim 16, wherein the acceptance of the option includes approval of revised terms and conditions for cellular wireless service for use of the eSIM.

19. An apparatus configured for cellular service plan transfer in a wireless device, the apparatus comprising:

at least one processor configured to cause the wireless device to:

detect presence of a universal integrated circuit card (UICC) storing a physical subscriber identity module (pSIM) in the wireless device, wherein the pSIM includes credentials for access to cellular service of a mobile network operator (MNO) in accordance with a cellular service plan;

determine at least one criterion is satisfied for transfer of the cellular service plan from the pSIM stored in the UICC to an electronic subscriber identity module (eSIM) to be installed on an embedded universal integrated circuit card (eUICC) of the wireless device, wherein the eSIM includes corresponding credentials for access to the cellular service of the MNO in accordance with the cellular service plan;

while wireless connectivity is available to the wireless device via a wireless connection other than via the pSIM:

obtain, from an entitlement server of the MNO via the wireless connection, transfer credentials authorizing transfer of the cellular service plan from the pSIM stored in the UICC to the eSIM to be installed on the eUICC; and obtain, from a provisioning server of the MNO via the wireless connection, the eSIM;

install the eSIM on the eUICC;

disable the pSIM on the UICC; and use the eSIM to attach the wireless device to a cellular wireless network of the MNO.

20. A method for cellular service plan transfer in a wireless device, the method comprising:

by the wireless device:

detecting presence of a universal integrated circuit card (UICC) storing a physical subscriber identity module (pSIM) in the wireless device, wherein the pSIM includes credentials for access to cellular service of a mobile network operator (MNO) in accordance with a cellular service plan;

determining at least one criterion is satisfied for transfer of the cellular service plan from the pSIM stored in the UICC to an electronic subscriber identity module (eSIM) to be installed on an embedded universal integrated circuit card (eUICC) of the wireless device, wherein the eSIM includes corresponding credentials for access to the cellular service of the MNO in accordance with the cellular service plan;

while wireless connectivity is available to the wireless device via a wireless connection other than via the pSIM:

obtaining, from an entitlement server of the MNO via the wireless connection, transfer credentials authorizing transfer of the cellular service plan from the pSIM stored in the UICC to the eSIM to be installed on the eUICC; and obtaining, from a provisioning server of the MNO via the wireless connection, the eSIM;

installing the eSIM on the eUICC;

disabling the pSIM on the UICC; and using the eSIM to attach the wireless device to a cellular wireless network of the MNO.

\* \* \* \* \*